United States Patent
Menon et al.

(10) Patent No.: US 12,041,535 B2
(45) Date of Patent: Jul. 16, 2024

(54) SYSTEM AND METHOD FOR NETWORK CONDITIONS AWARE CONTENT DISTRIBUTION

(71) Applicant: Siden, Inc., New York, NY (US)

(72) Inventors: Narayan Parappil Menon, Syosset, NY (US); Boris Bogatin, Glenside, PA (US); Ankur Verma, San Diego, CA (US)

(73) Assignee: Siden, Inc., New York, NY (US)

( * ) Notice: Subject to any disclaimer, the term of this patent is extended or adjusted under 35 U.S.C. 154(b) by 305 days.

(21) Appl. No.: 17/700,436

(22) Filed: Mar. 21, 2022

(65) Prior Publication Data
US 2022/0303881 A1    Sep. 22, 2022

Related U.S. Application Data

(60) Provisional application No. 63/163,978, filed on Mar. 22, 2021.

(51) Int. Cl.
| | |
|---|---|
| *H04W 48/16* | (2009.01) |
| *H04W 28/02* | (2009.01) |
| *H04W 28/08* | (2023.01) |

(52) U.S. Cl.
CPC ....... *H04W 48/16* (2013.01); *H04W 28/0252* (2013.01); *H04W 28/0289* (2013.01); *H04W 28/0858* (2020.05)

(58) Field of Classification Search
None
See application file for complete search history.

(56) References Cited

U.S. PATENT DOCUMENTS

| | | |
|---|---|---|
| 5,652,759 A | 7/1997 | Stringfellow, Jr. |
| 9,456,247 B1 | 9/2016 | Pontual et al. |

(Continued)

FOREIGN PATENT DOCUMENTS

| | | |
|---|---|---|
| CN | 1984118 A | 6/2007 |
| CN | 105391516 A | 3/2016 |

(Continued)

OTHER PUBLICATIONS

International Search Report and Written Opinion dated Mar. 14, 2023 in corresponding PCT Application No. PCT/US2022/046640.

(Continued)

*Primary Examiner* — Anh Ngoc M Nguyen
(74) *Attorney, Agent, or Firm* — Harness, Dickey & Pierce, P.L.C.

(57) ABSTRACT

A method and system for operating a radio aware communication system includes receiving, by a content distribution system, a radio quality metric signal from a user device or a network; determining, by the content distribution system, a spectral efficiency for the user device based on the radio quality metric signal; receiving a capacity usage report from a first network; determining an available capacity of the first network based on the capacity usage report; determining a target available capacity utilization goal of the first network based on the available capacity; determining a target throughput based on the target available capacity utilization goal for communicating content to a user device and the spectral efficiency for the user device; and communicating the content to the user device using the target throughput through the first network.

60 Claims, 11 Drawing Sheets

(56) References Cited

U.S. PATENT DOCUMENTS

| | | |
|---|---|---|
| 10,433,022 B2 | 10/2019 | Norin et al. |
| 2004/0064325 A1 | 4/2004 | Syed et al. |
| 2007/0002871 A1 | 1/2007 | Pekonen et al. |
| 2007/0005749 A1* | 1/2007 | Sampath ............... H04B 7/063 709/223 |
| 2007/0094023 A1 | 4/2007 | Gallino et al. |
| 2008/0244657 A1 | 10/2008 | Arsenault et al. |
| 2008/0273591 A1 | 11/2008 | Brooks et al. |
| 2009/0040957 A1 | 2/2009 | Anschutz |
| 2010/0023972 A1 | 1/2010 | Summers et al. |
| 2011/0044227 A1 | 2/2011 | Harrang et al. |
| 2011/0059706 A1 | 3/2011 | Harel et al. |
| 2013/0066936 A1 | 3/2013 | Krishnan et al. |
| 2013/0254815 A1 | 9/2013 | Pfeffer et al. |
| 2013/0286877 A1* | 10/2013 | Chung .............. H04W 36/0085 370/252 |
| 2014/0334318 A1 | 11/2014 | Pica et al. |
| 2016/0028448 A1 | 1/2016 | Park et al. |
| 2016/0360255 A1 | 12/2016 | Pontual et al. |
| 2018/0138958 A1 | 5/2018 | Asplund et al. |
| 2018/0139508 A1 | 5/2018 | Norin et al. |
| 2019/0223029 A1 | 7/2019 | Clarke et al. |
| 2019/0273801 A1 | 9/2019 | Luft |
| 2020/0037035 A1 | 1/2020 | Kaufman et al. |
| 2020/0195745 A1 | 6/2020 | Demsey |
| 2020/0243985 A1 | 7/2020 | Petersson et al. |
| 2020/0296155 A1 | 9/2020 | McGrath et al. |
| 2020/0328804 A1* | 10/2020 | Xu ..................... H04W 72/121 |
| 2020/0358646 A1 | 11/2020 | Lincoln et al. |
| 2020/0374713 A1 | 11/2020 | Bogatin et al. |
| 2021/0067814 A1 | 3/2021 | Bogatin et al. |
| 2021/0098873 A1 | 4/2021 | Veysoglu et al. |
| 2021/0099749 A1 | 4/2021 | Bogatin et al. |
| 2021/0127167 A1 | 4/2021 | Kaufman et al. |

FOREIGN PATENT DOCUMENTS

| | | |
|---|---|---|
| EP | 1030465 A1 | 8/2000 |
| EP | 3456083 B1 | 3/2020 |
| JP | 2001-313599 A | 11/2001 |
| JP | 2002-152153 A | 5/2002 |
| JP | 2003-169363 A | 6/2003 |
| JP | 2010-027004 A | 2/2010 |
| JP | 2015-532033 A | 11/2015 |
| KR | 2011-0093993 A | 8/2011 |
| WO | WO-03058967 A1 | 7/2003 |
| WO | WO-2011/139305 A1 | 11/2011 |
| WO | WO-2013103828 A1 | 7/2013 |
| WO | WO-2018/001897 A1 | 1/2018 |

OTHER PUBLICATIONS

Symeon Chatzinotas et al., "Cellular-Broadcast Service Convergence through Caching for CoMP Cloud RANs", Arxiv. Org, Cornell University Library, 201 Olin Library Cornell University Ithaca, NY 14853, Apr. 30, 2015.

International Search Report and Written Opinion dated Aug. 19, 2022 in corresponding PCT Application No. PCT/US2022/031517.

International Search Report dated Nov. 4, 2022 in corresponding PCT Application No. PCT/US2022/037896.

Chinese Office Action dated Apr. 3, 2020 in corresponding Chinese Application No. 2017800705362.

Datami website; http://www.datami.com/; 9 pages.

International Search Report and Written Opinion dated Mar. 21, 2022 in corresponding PCT Application No. PCT/US2021/053154.

International Search Report and Written Opinion dated Jul. 17, 2020 in corresponding PCT/US2020/034247.

International Search Report and Written Opinion dated Dec. 9, 2020 in corresponding PCT Application No. PCT/US2020/053313.

International Search Report and Written Opinion dated Apr. 21, 2022 in corresponding PCT Application No. PCT/US2022/013293.

International Search Report and Written Opinion mailed Jun. 21, 2022, in corresponding International Application No. PCT/US2022/021306.

Interntional Search Report dated Oct. 21, 2021 in corresponding PCT Application No. PCT/US2021/041116.

Japanese Office Action dated Dec. 1, 2020 in corresponding Japanese Application No. 2019-547232.

Non-Final Office Action regarding U.S. Appl. No. 15/811,958 dated Oct. 10, 2018.

Notice of Allowance regarding U.S. Appl. No. 15/811,958 dated May 22, 2019.

Partial International Search Report for corresponding PCT/US2017/061760, Mar. 20, 2018, 13 pages.

Pixeom website; https://pixeom.com/; 10 pages.

Requirement for Restriction Election regarding U.S. Appl. No. 15/811,958 dated Jun. 7, 2018.

Yao Jingjing et al., "On Mobile Edge Caching", IEEE Communications Surveys & Tutorials, vol. 21, No. 3, Mar. 29, 2019, pp. 2525-2553.

International Search Report and Written Opinion dated Aug. 1, 2022 in corresponding PCT Application No. PCT/US2022/028725.

* cited by examiner

SYSTEM AND METHOD FOR NETWORK
CONDITIONS AWARE CONTENT
DISTRIBUTION

This application is a non-provisional of U.S. Application 63/163,9787 filed on Mar. 22, 2021, the disclosure of which is incorporated by reference herein. This application incorporates by reference herein the entire disclosures of provisional U.S. Ser. No. 63/051,582, filed on Jul. 14, 2020, U.S. Ser. No. 63/050,699, filed on Jul. 10, 2020, U.S. Ser. No. 17/095,686, filed on Nov. 11, 2020, U.S. Ser. No. 16/588, 763, filed Sep. 30, 2019, U.S. Pat. No. 10,433,022 and U.S. Ser. No. 17/353,989, filed Jun. 22, 2021, Ser. No. 17/580, 817, filed Jan. 21, 2022.

TECHNICAL FIELD

The present disclosure relates generally to content distribution systems and, more specifically, to a method and system for strategically determining using radio quality metrics for determining how to communicate data through a communication system.

BACKGROUND

The statements in this section merely provide background information related to the present disclosure and may not constitute prior art.

The provisioning of increasingly higher speed wireless data connectivity has been the focus of wireless carrier infrastructure growth for several decades, and has accelerated with the rapidly rising demand by consumers to stream video to each or any of their devices, irrespective of where they are. The increasing wireless performance, together with both users' desires to consume more bandwidth intensive video content over the Internet, at lower marginal cost per bit, and wireless providers desire to serve more of the users' demands including in the home and also to large screen devices (i.e. TVs, laptops), is placing a requirement on wireless networks to accommodate a markedly higher level of capacity for handling this exploding video data traffic demand over wireless networks.

Content distribution systems deliver content over wireless networks in a "transparent", "over-the-top" fashion, unaware of, and without factoring in, the state of the network, i.e., whether the network is busy or not; of how busy or free the network might be; how much capacity may be free within the network; and of what the state of the delivered-to device(s) might be.

Known content distribution systems are unaware of: (a) the radio conditions the targeted device(s) is/are experiencing—something that influences the radio efficiency with which the device(s) can receive content, and hence the throughputs the devices can achieve through the network; (b) the capacity available in the delivering network, which also influences the achievable throughput; and (c) other factors such as how the network is performing in terms of throughput, latency and other performance metrics.

Known content distribution systems tend to push data through wireless networks. No knowledge of how much load the underlying network is able to sustain is used. This can lead to situations where excess data pushed into the network eventually gets dropped, since the network is unable to deliver data at the "pushed" rate. This can result in high levels of packet loss, resulting in the distribution system having to retransmit chunks of data to devices that missed out on those chunks of data in the first place. There is some intelligence in application clients that may sense the network to estimate available bandwidth, and adjust the bitrate versions of content to pull into the device. The version level is regulated by the end user device and the network thus has no knowledge of such a change.

SUMMARY

The present disclosure provides a method for delivering data to user devices taking into consideration the radio network state determine which resources are to be used in delivering content.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method that includes receiving, by a content distribution system, a radio quality metric signal from a user device or a network; determining, by the content distribution system, a spectral efficiency for the user device based on the radio quality metric signal; receiving a capacity usage report from a first network; determining an available capacity of the first network based on the capacity usage report; determining a target available capacity utilization goal of the first network based on the available capacity; determining a target throughput based on the target available capacity utilization goal for communicating content to a user device and the spectral efficiency for the user device; and communicating the content to the user device using the target throughput through the first network. Other embodiments of this aspect include corresponding computer systems, apparatus, and computer programs recorded on one or more computer storage devices, each configured to perform the actions of the methods.

Implementations may include one or more of the following features. The method where communicating the content to the user device may include communicating the content to the user device by unicasting. Receiving the radio quality metric signal may include receiving the radio quality metric signal from a base station of the network Receiving radio quality metric signal may include receiving at least one of a signal strength, a signal-to-interference/noise ratio measurement signal round-trip latency, a channel quality indicator, and an achieved throughput. Determining the spectral efficiency may include determining the spectral efficiency from a modulation and coding scheme determined based on the at least one of at least one of the signal strength, the signal-to-interference/noise ratio measurement signal, round-trip latency, the channel quality indicator, and the achieved throughput. Receiving radio quality metric signal may include receiving, a signal-to-interference/noise ratio measurement signal. The method may include receiving the content at the user device after communicating the content, and thereafter communicating an achieved throughput signal or round-trip latency to the content distribution system and the capacity used in communicating. Receiving the capacity usage report may include receiving an amount of available network capacity in the capacity usage report. Receiving the capacity usage report may include receiving the capacity usage report may include at least one of capacity used by user traffic associated with a network operator, a total capacity of the network, a capacity used by a dormant capacity communication system, and total capacity used by any traffic. Determining the available capacity may include determining the available capacity based on the total capacity used by any traffic minus the capacity used by the capacity used by the dormant capacity communication system. The method may include determining the capacity used by the dormant capacity communication system may include estimating a throughput sent to user devices over a period of time and the spectral efficiency of the user devices receiving dormant capacity content. The capacity usage report may include available capacity of the network and a time period for the available capacity. The capacity usage report may include a percentage of available physical resource blocks or spectrum used by user devices associated with a network operator. The capacity usage report may include available physical resource blocks or available spectral capacity. The capacity usage report may include a total of physical resource blocks used by user devices or an amount of spectrum using the first network. Determining a target available capacity utilization goal of the first network based on the available capacity may include identifying a desired total network loading by all network traffic, or achieving a network loading having a predetermined margin of available capacity unused. Determining a target throughput based on the target available capacity utilization goal for communicating content to a user device and the spectral efficiency for the user device may include multiplying the spectral efficiency for a user device by the target available capacity utilization goal. The method may include determining a time for delivery by choosing to communicate content to a first user device at a first time when the radio quality metrics of the first user device are greater than the radio quality metrics for a second user device, and, at a second time later than the first time, communicating the content to the second user device when the radio quality metrics of the second user device improve. The method may include selecting one of a plurality of networks to communicate content to the user device based on the radio quality metric signal to achieve a highest throughput to the user device, or to achieve a higher overall spectral efficiency compared to communicating to a plurality of user devices by the plurality of networks. The method may include determining the target throughput by adding the target throughputs to the user device with the target throughputs to other user devices to be served by a dormant capacity communication system at a given time. The method may include aggregating a plurality of networks to communicate content to the user device based on the radio quality metric signal for each network and selecting a mix of networks based on the radio quality metric signal for each network based on achieving a highest throughput to the user device at an instant in time or achieving a higher overall spectral efficiency when considering communication to a plurality of user devices being communicated to by the plurality of networks. Communicating the content using the target throughput through dormant capacity of the first network. Determining the target throughput may include determining the target throughput from a plurality of capacity usage reports from a plurality of networks and where communicating content may include selecting one of the plurality of networks or aggregating at least some of the plurality of networks to communicate content. Selecting or aggregating may include selecting one of a plurality of base stations or aggregating the plurality of base stations for communicating the content to the user device. Selecting or aggregating may include selecting or aggregating a plurality of cells within a base station for communicating content to the user device. Selecting or aggregating may include selecting or aggregating a plurality of cells or base stations from different network operators for communicating the content to the user device. Selecting or aggregating may include selecting or aggregating a plurality of technologies for communicating the content to the user device. The plurality of technologies may include 4g and 5g. Selecting or aggregating may include selecting or aggregating a plurality of networks or a plurality of technologies for communicating the content to the user device based on radio conditions. Selecting or aggregating may include selecting or aggregating a plurality of cells across a plurality of technologies for communicating the content to the user device. Implementations of the described techniques may include hardware, a method or process, or computer software on a computer-accessible medium.

One general aspect includes. The method also includes a content distribution system receiving a radio quality metric signal from a user device or a network; the content distribution system determining a spectral efficiency for the user device based on the radio quality metric signal, the content distribution system receiving a capacity usage report from a first network, the content distribution system determining an available capacity of the first network based on the capacity usage report, the content distribution system determining a target available capacity utilization goal of the first network based on the available capacity, the content distribution system determining a target throughput based on the target available capacity utilization goal for communicating content to a user device and the spectral efficiency for the user device, and the content distribution system communicating the content to the user device using the target throughput through the first network. Other embodiments of this aspect include corresponding computer systems, apparatus, and computer programs recorded on one or more computer storage devices, each configured to perform the actions of the methods.

Implementations may include one or more of the following features. The system where the content distribution system communicating the content to the user device by unicasting. The content distribution system receives the radio quality metric signal from a base station of the network The radio quality metric signal may include at least one of a signal strength, a signal-to-interference/noise ratio measurement signal round-trip latency, a channel quality indicator, and an achieved throughput. The spectral efficiency is based on a modulation and coding scheme determined based on the at least one of at least one of the signal strength, the signal-to-interference/noise ratio measurement signal, round-trip latency, the channel quality indicator, and the achieved throughput. The radio quality metric signal may include a signal-to-interference/noise ratio measurement signal. The user device after communicating the content communicates an achieved throughput signal or round-trip latency to the content distribution system and the capacity used in communicating. The capacity usage report an amount of available network capacity. The capacity usage report may include at least one of capacity used by user traffic associated with a network operator, a total capacity of the network, a capacity used by a dormant capacity communication system, and total capacity used by any traffic. The available capacity is based on the total capacity used by any traffic minus the capacity used by the capacity used by the dormant capacity communication system. The capacity used by the dormant capacity communication system may include a throughput sent to user devices over a period of time and the spectral efficiency of the user devices receiving dormant capacity content. The capacity usage report may include available capacity of the network and a time period for the available capacity. The capacity usage report may include a percentage of available physical resource blocks or spectrum used by user devices associated with a network operator. The capacity usage report may include available physical resource blocks or available spectral capacity. The capacity usage report may include a total of physical resource blocks used by user devices or an amount of spectrum using the first network. A target available capacity utilization goal of the first network is based on a desired total network loading by all network traffic, or a network loading having a predetermined margin of available capacity unused. The target available capacity utilization goal may include a product of the spectral efficiency for a user device and the target available capacity utilization goal. The system may include a time for delivery to a first user device at a first time when the radio quality metrics of the first user device are greater than the radio quality metrics for a second user device, and, at a second time later than the first time, and to the second user device when the radio quality metrics of the second user device improve. The system the content distribution system selects one of a plurality of networks to communicate content to the user device based on the radio quality metric signal to achieve a highest throughput to the user device, or to achieve a higher overall spectral efficiency compared to communicating to a plurality of user devices by the plurality of networks. The target throughput by adding the target throughputs to the user device with the target throughputs to other user devices to be served by a dormant capacity communication system at a given time. The content distribution system aggregates a plurality of networks to communicate content to the user device based on the radio quality metric signal for each network and selects a mix of networks based on the radio quality metric signal for each network based on achieving a highest throughput to the user device at an instant in time or achieving a higher overall spectral efficiency when considering communication to a plurality of user devices being communicated to by the plurality of networks. The content distribution system communicates the content using the target throughput through dormant capacity of the first network. The target throughput is based on a plurality of capacity usage reports from a plurality of networks and where the content distribution system communicates content by selecting one of the plurality of networks or aggregating at least some of the plurality of networks to communicate content. The content distribution system selects or aggregates by selecting one of a plurality of base stations or aggregating the plurality of base stations for communicating the content to the user device. The content distribution system selects or aggregates by selecting or aggregating a plurality of cells within a base station for communicating content to the user device. The content distribution system selects or aggregates by selecting or aggregating a plurality of cells or base stations from different network operators for communicating the content to the user device. The content distribution system selects or aggregates by selecting or aggregating a plurality of technologies for communicating the content to the user device. The plurality of technologies may include 4g and 5g. The content distribution system selects or aggregates by selecting or aggregating a plurality of networks or a plurality of technologies for communicating the content to the user device based on radio conditions. The content distribution system selects or aggregates by selecting or aggregating a plurality of cells across a plurality of technologies for communicating the content to the user device. Implementations of the described techniques may include hardware, a method or process, or computer software on a computer-accessible medium.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 5:
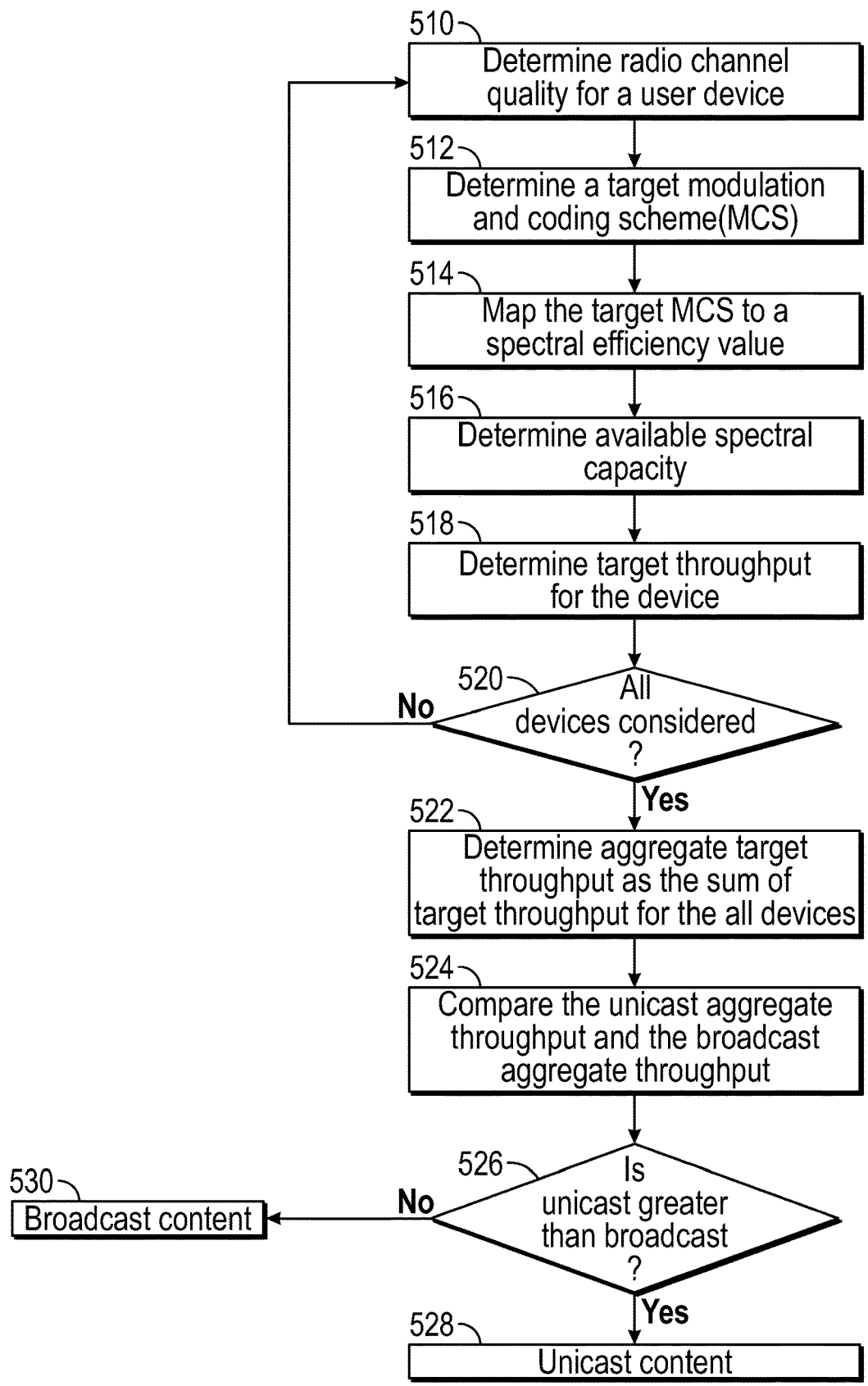

FIG. 5 determining unicast or broadcast for communicating content is a flowchart for a method of migrating from a unicast to a broadcast.

Figure 6:
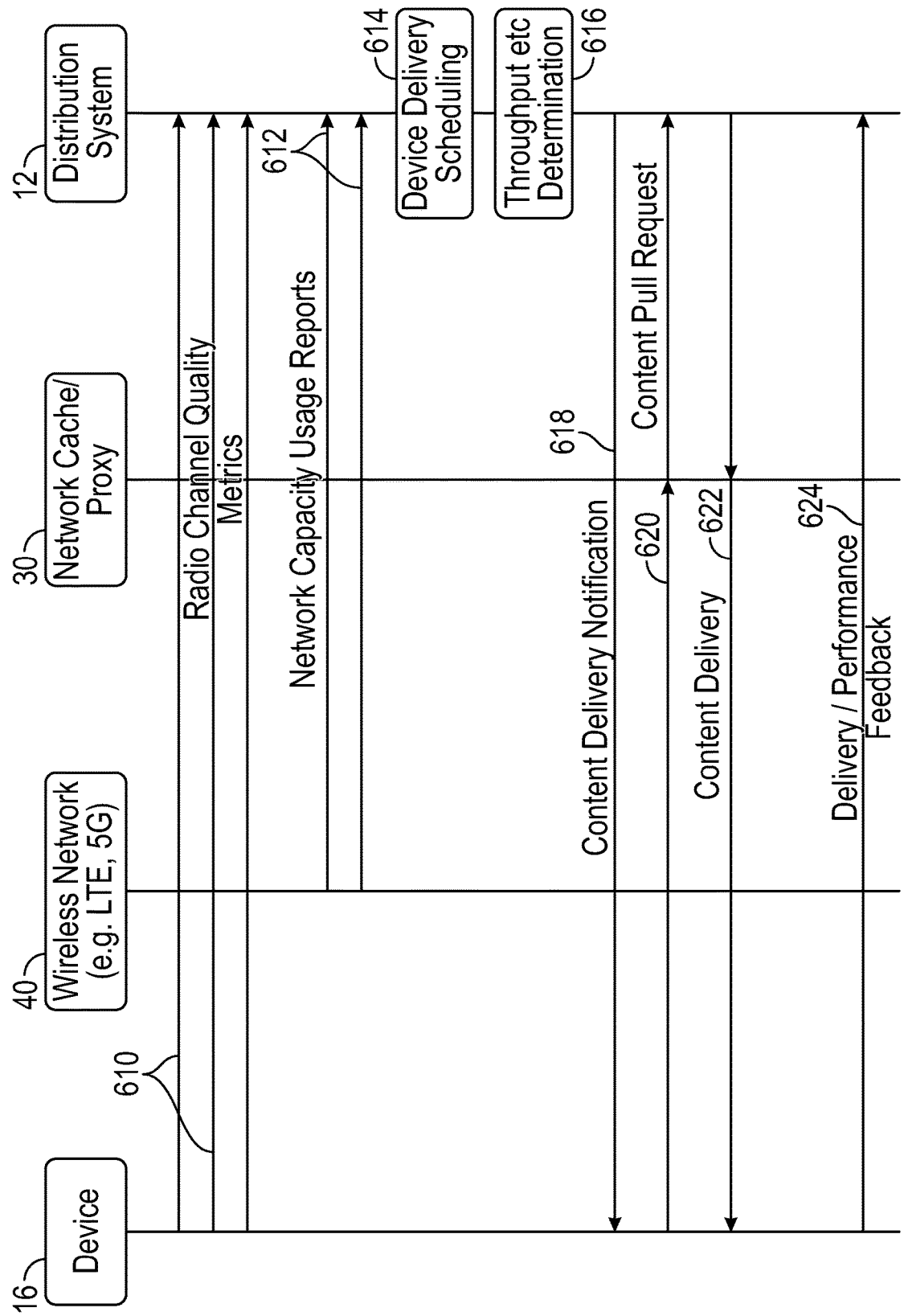

FIG. 6 is a signal diagram for communicating content.

Figure 7:
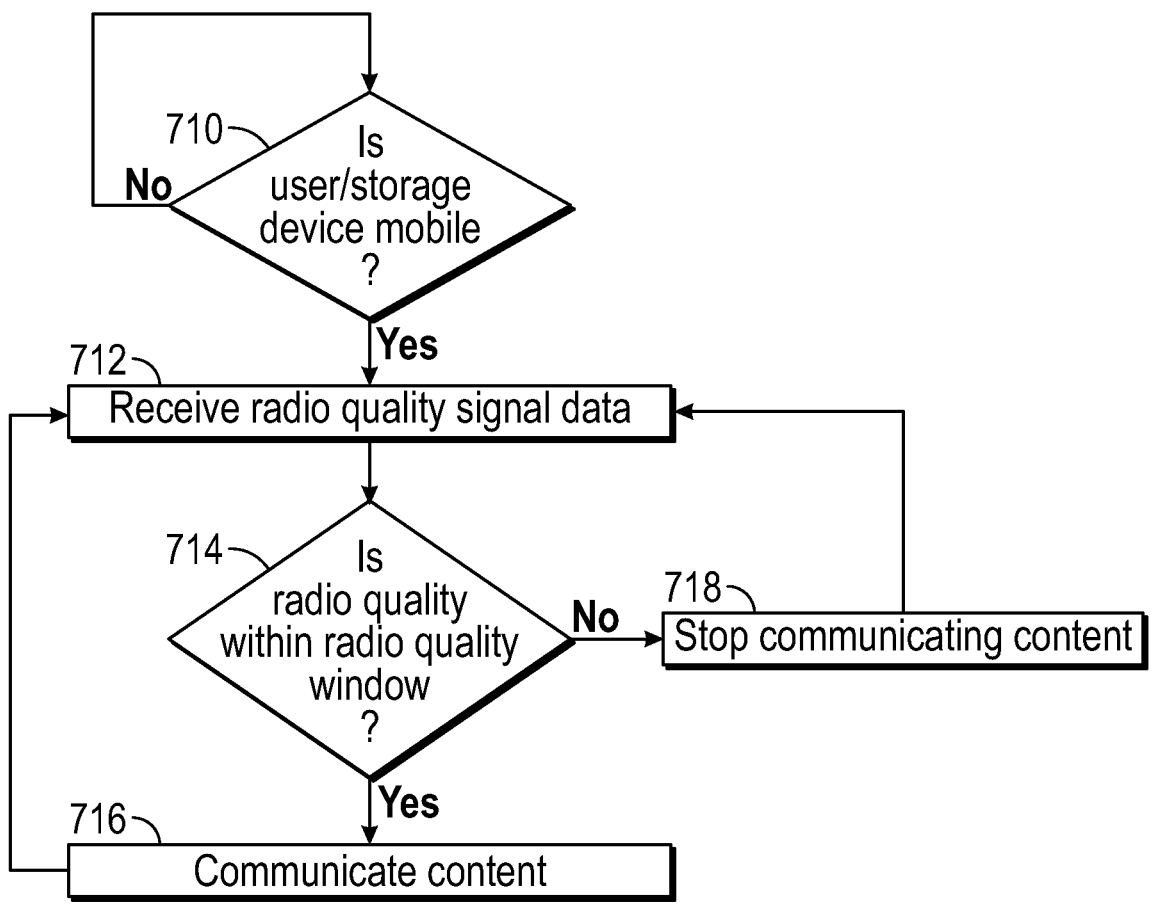

FIG. 7 is a flowchart of a method for communicating based on radio quality.

Figure 8:
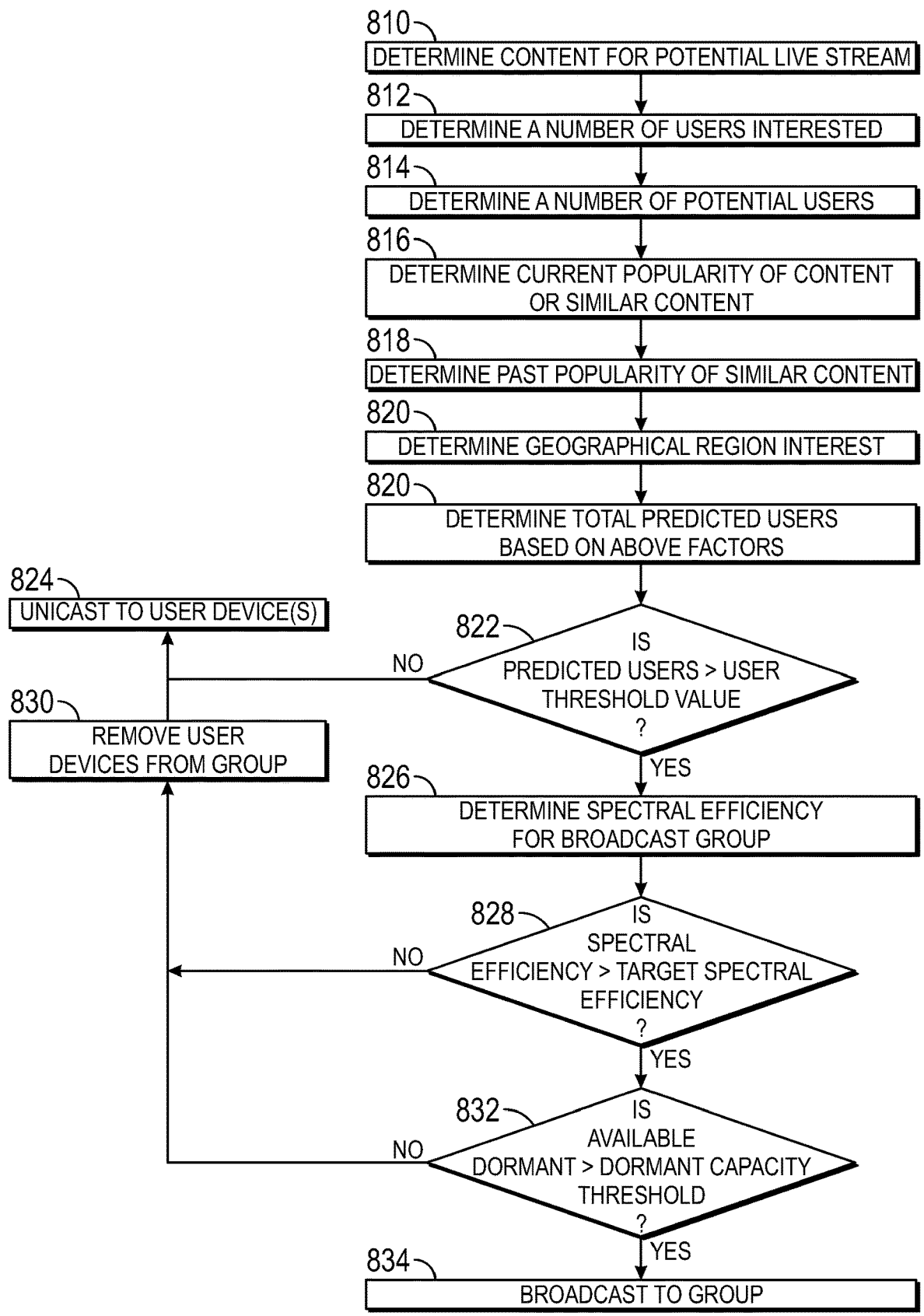

FIG. 8 a flowchart of a method for broadcasting or unicasting based on various criteria. operating a device and switching the device to receive a broadcast stream.

Figure 9:
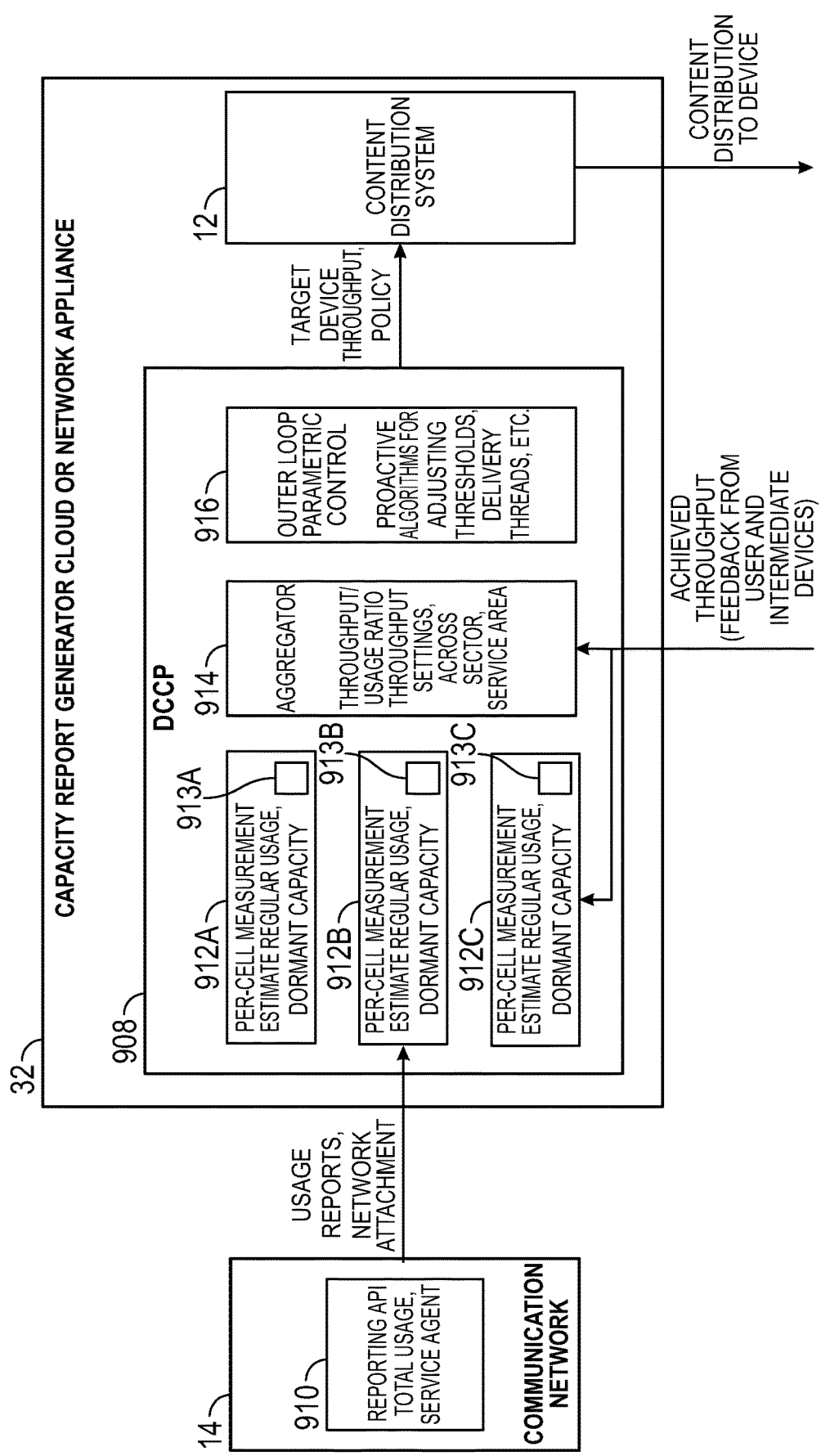

FIG. 9 is a block diagram of a dormant capacity control circuit.

Figure 10:
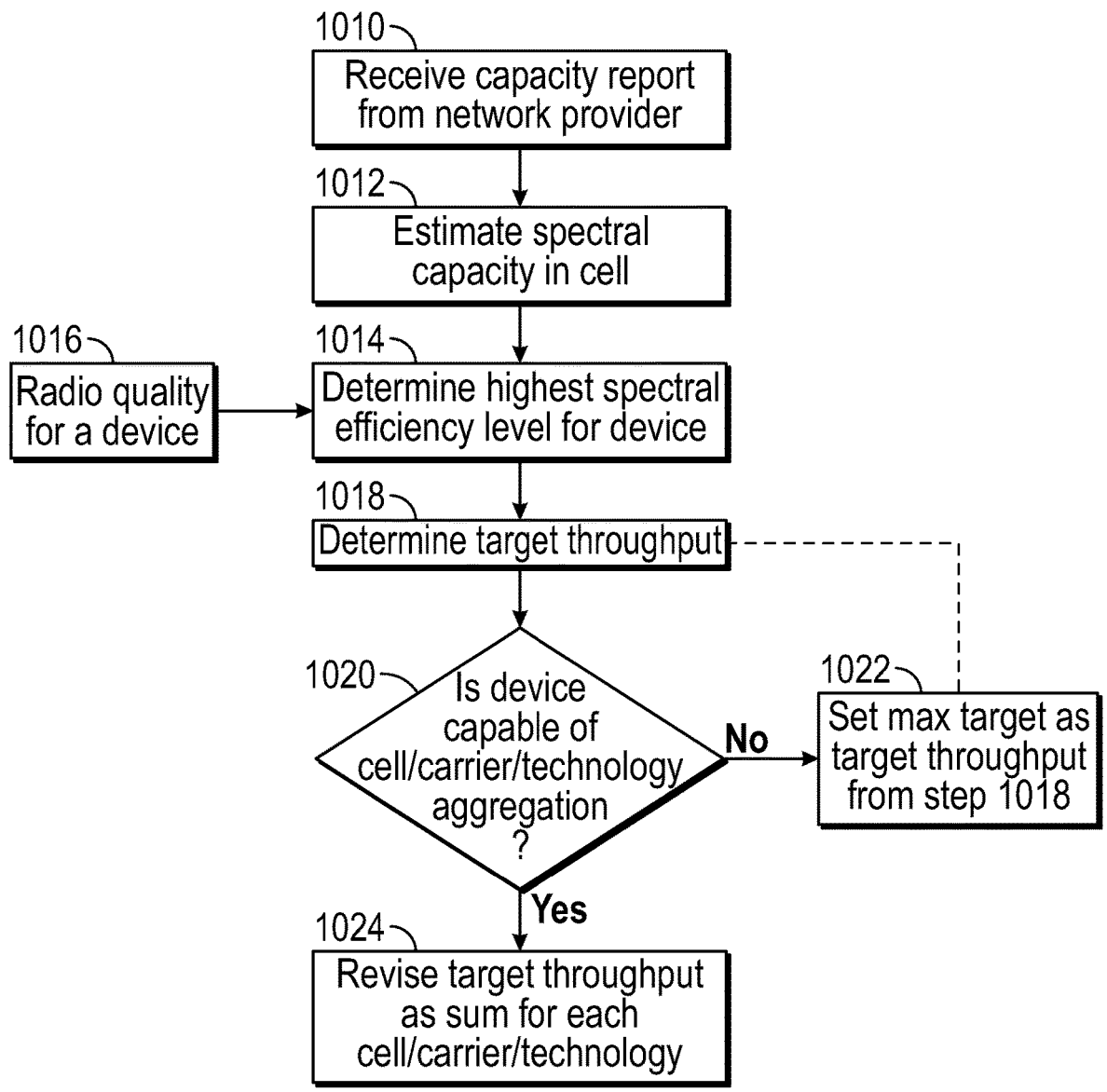

FIG. 10 is a flowchart of a method for communicating using aggregation of resources.

Figure 11:
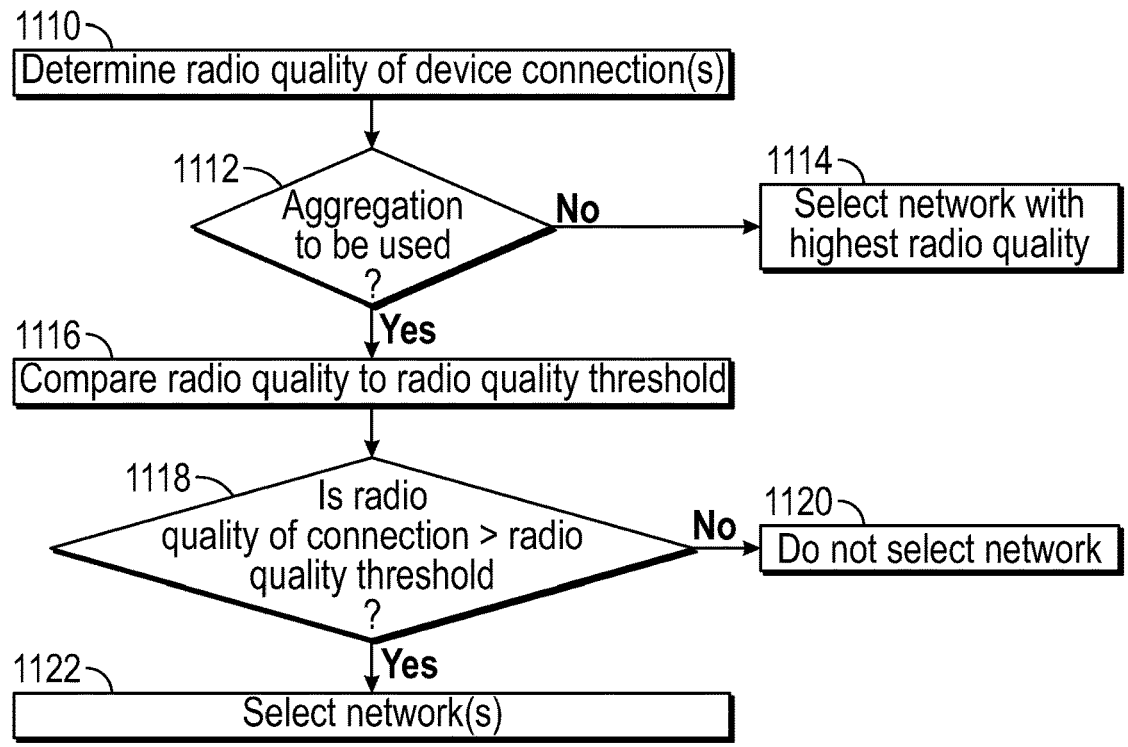

FIG. 11 is a flowchart of a method for selecting a network based on radio quality.

Figure 12:
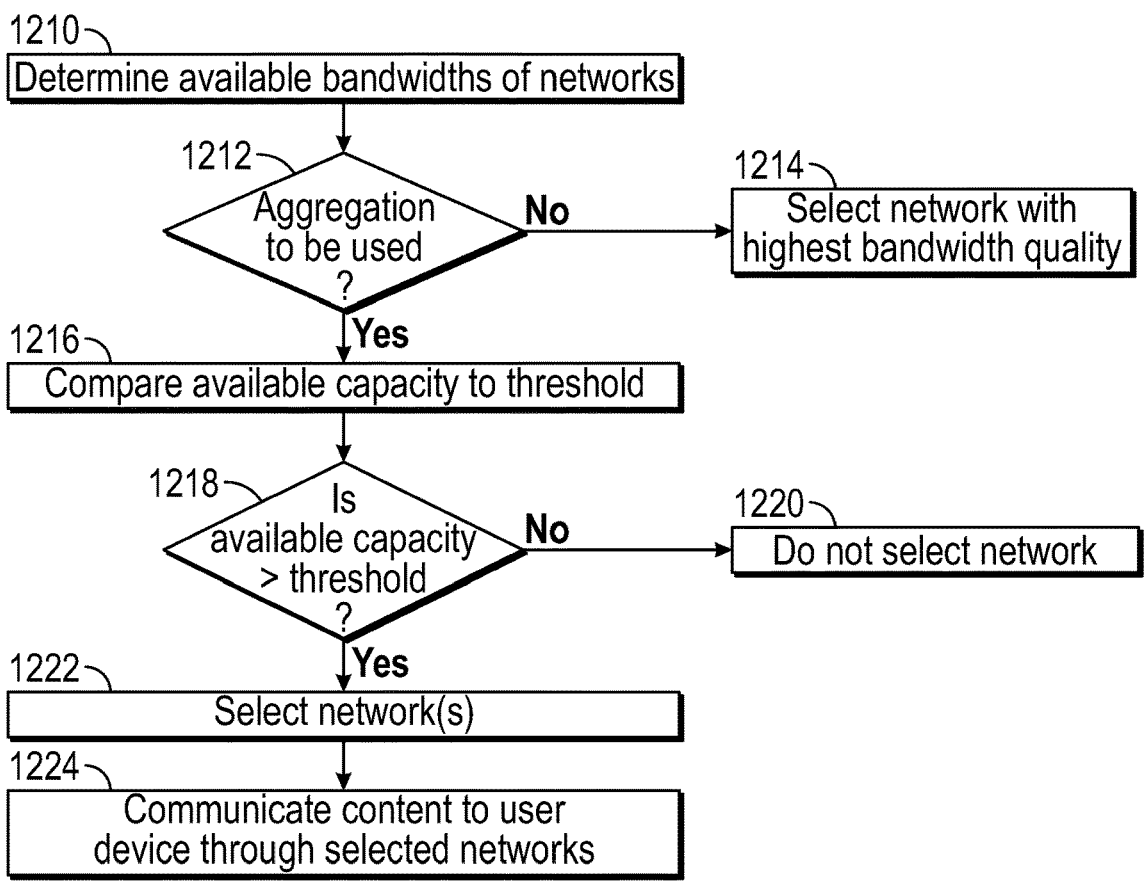

FIG. 12 is a flowchart of a method for selecting a network based on bandwidth available.

DETAILED DESCRIPTION

The following description is merely exemplary in nature and is not intended to limit the present disclosure, application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical OR. It should be understood that steps within a method may be executed in different order without altering the principles of the present disclosure. The teachings of the present disclosure can be implemented in a system for electronically communicating content to an end user or user device. Both the data source and the user device may be formed using a general computing device having a memory or other data storage for incoming and outgoing data. The memory may comprise but is not limited to a hard drive, FLASH, RAM, PROM, EEPROM, ROM phase-change memory or other discrete memory components.

Each general purpose computing device may be implemented electronically in analog circuitry, digital circuitry or combinations thereof. Further, the computing device may include a microprocessor or microcontroller that is programmed to perform instructions to carry out the steps performed by the various system components. A content or service provider is also described. A content or service provider is a provider of data to the end user. The service provider, for example, may provide data corresponding to the content such as metadata as well as the actual content in a data stream or signal. The content distribution system, service provider and end user devices may include a general purpose computing device, communication components, network interfaces and other associated circuitry to allow communication with various other devices in the system.

Further, while the following disclosure is made with respect to the delivery of video (e.g., television (TV), movies, music videos, etc.), it should be understood that the systems and methods disclosed herein could also be used for delivery of any media data and content type, for example, audio, music, data files, web pages, advertising, software, software updates, IoT data, weather, application, application data, "best of web" content, e-delivery of materials, etc. Additionally, throughout this disclosure reference is made to data, content, information, software programs, movie trailers, movies, advertising, assets, video data, etc., however, it will be readily apparent to persons of ordinary skill in the art that the terms are substantially equivalent in reference to the example systems and/or methods disclosed herein.

While the following disclosure is made with specific broadcast services and network systems, it should be understood that many other delivery systems are readily applicable to disclosed systems and methods. Such systems include wireless terrestrial distribution systems, wired or cable distribution systems, cable television distribution systems, Ultra High Frequency (UHF)/Very High Frequency (VHF) radio frequency systems or other terrestrial broadcast systems (e.g., Multi-channel Multi-point distribution system (MMDS), Local Multi-point distribution system (LMDS), etc.), Internet-based distribution systems, or mobile distribution systems, power-line broadcast systems, any point-to-point and/or multicast Internet Protocol (IP) delivery network, and fiber optic networks. Further, the different functions collectively allocated among a service provider and intermediate devices as described below can be reallocated as desired without departing from the intended scope of the present disclosure.

User devices may be coupled to the Internet through a constrained network or not even coupled to the Internet at all. In a constrained network, the speed or available resources may not be sufficient to provide a quality level of service. In the present examples, dormant capacity of the constrained network or a second less constrained network may be used to pre-position content at an intermediate device or a user device. The pre-positioned content may then be provided from intermediate device storage directly or through a second communication network (i.e., local network) when demanded at the user device for real-time consumption, without having to rely on using the constrained network for that real-time consumption. In certain instances, the word "user" is used interchangeably with a device associated with a user (a user device) since each user has a user device associated therewith.

Dormant capacity is a resource or a plurality of resources that are not being used for transmitting data or content by a content system provider during regular customer use. Regular use of a communication network for primary customers may be referred to as a primary use. Dormant capacity may be referred to as a secondary use and may be governed between agreements between a content provider and a communication system provider. The content provider may wish to provide a service to users using the dormant capacity. Users may not be aware of the path the content traverses. The use of resources for the dormant capacity has a lower priority that can be allocated to another for a higher priority use. In the simplest sense, dormant capacity is a data path or bandwidth that is increasingly left unutilized during non-peak times of network use. Inversely, there is limited dormant capacity available during the peak times of network use. In all cases, such peak time of network use is characterized as the time when most of the usage of the services offered by the network is taking place by the network's users or direct customers. The non-peak time is the time when the least usage of the services is taking place by their users. For example, in a long-term evolution wireless network (LTE) system, dormant capacity may be the bandwidth not being used for voice or data content requested from users in real-time. In the cases of "spectrum re-use," capacity used by some users for real-time consumption of some content during peak times, may leave dormant capacity at the same time as capacity that is either unusable by other users for real-time consumption of other content or only usable by other users for real-time consumption of the same content, if that content is broadcasted instead of unicasted. In the case of "network re-use," capacity used by some users for real-time consumption of content may leave dormant capacity that is not demanded by other users. In a satellite system, the dormant capacity is the bandwidth not being used for broadcasting of content to users for the sake of real-time consumption of such content or for voice or data content requested from users in real-time and may similarly be under-utilized as in wireless network systems. There is a very limited incremental cost for utilizing this dormant capacity, or the unused or under-used resources of a communication provider's network, as that cost is already being borne for the provision of regular customer use services, and as such offers means for highly cost effective content distribution. By utilizing the dormant capacity that would otherwise be wasted, the present system allows communication system providers to use it to offer other services to customers or to sell the capacity to others.

The dormant capacity may be used in various ways by intercommunication of the intermediate devices, the communication system provider, and the content service provider. In the cases of "spectrum re-use", there have been many efforts to generate additional parallel uses of the same spectrum for real-time consumption by multiple users, using the same spectrum. However, utilizing dormant capacity, an almost infinitely high (as far as the number of users benefitting) amount of re-use can be generated by simply broadcasting this content, instead of unicasting it, and by having some users use it for real-time consumption, and for the dormant capacity to be used for non-real-time consumption by storing this same content at other intermediate storage devices at this same time, and then accessed by other users during a different time in the future, directly or using other communication networks, which may also be less constrained than the network described herein. Further, in the cases of "network re-use", today this dormant capacity goes largely unutilized as operators have had a challenging time of incentivizing "changes in user behavior" to use the network more during "off-peak" times than they otherwise would like for real-time consumption—the benefit to consumers of using the network during peak times for real-time consumption instead of during off-peak times, far outweigh any incentives or benefits which the operators can pass on to the consumers to shift their real-time consumption. However, such dormant capacity can be used in-full for non-real-time consumption, by unicasting or broadcasting content using dormant capacity and by storing this content at other intermediate storage devices, and then accessed by other users during a different time in the future, directly or using other communication networks, which may be less constrained than the network described herein.

Queries as to the current availability of capacity and the upcoming availability of capacity, including real-time consumptions and the remaining capacity, may be formed in order to identify the availability of dormant capacity. Further, Quality of service (QoS) prioritization using evolved multimedia broadcast and multicast services (eMBMS) quality class identifiers, as well as quality-of-service class identifiers (QCIs) used in any wireless or other communication system, may be performed, providing higher QCI levels to traffic for real-time consumption, while leaving traffic for non-real-time consumption on lower QCI levels, effectively rendering it to use of dormant capacity only.

Prioritization of content to be communicated using the dormant capacity may be formed. Delivery of content using dormant capacity may be queue-driven. All of the content to be delivered may be placed into the queue with attributed priority levels for each portion of content, and then served from the queue automatically upon dormant capacity availability, coordinating which content is served in which sequence per what rule. Content may also be retransmitted using dormant capacity. User preferences (queuing), missing content (error correction), content most popular for some users (personalization), content most popular for most users (popularity or short-tail optimization), as well as the remainder of content may all be used in prioritizing within queues.

The present system provides a high-capacity broadcast delivery system or a targeted unicast delivery system for pre-positioning content, that combines the strategic use of excess capacity or dormant capacity in a content communication network with pre-positioning content close to the users by caching and storage of such content at local content stores, to allow users to access a large amount of content such as over-the-top (OTT) content, software updates, or other highly intensive data applications without needing to traverse the content communication network at the time the content is desired. This system may use the dormant capacity of a system over the same exact spectrum (in the case of spectrum re-use) as real-time consumption by broadcasting content to users including to those requesting it for real-time consumption and to others using the dormant spectrum capacity for pre-positioning, instead of just unicasting it to only the users requesting it for real-time consumption, or over dormant capacity left-over from non-peak-use of networks for real-time consumption, by unicasting or broadcasting content for pre-positioning. As will be further described below, the system may use dormant capacity of different types of communication systems including but not limited to mobile or cellular systems such as an LTE system, a satellite system or a digital television system. Content such as video content may be provided to an intermediate device, which stores the content therein. When users request content for real-time consumption, the content may be provided from the stored or cached content store, rather than requiring that content to be served by the content communication network in response to users' requests and subjecting users to slow speeds of the constrained content communication network or from further burdening the content communication network. A wide variety of video programming including movies, television, shows, documentaries and news may be provided based upon user preferences. Also, other types of video programming such as instant replays may also be provided to users. The system may also be used to provide software and application updates for various types of users that are coupled to the intermediate device. The system may also be used for defense purposes or purposes in which high amounts of data are required, but whereas such data may be pre-positioned at the local content store by the content communication network and not be required to be delivered from the source of such data on a live or real-time basis.

The system is particularly suitable for rural customers, customers in markets with lower speed, lower capacity networks, or customers of companies that want to utilize their lower speed networks to offer an equivalent of high-speed cable or fiber network offerings, to have access to large data, over-the-top services or other large data applications. Specifically, the system may also allow non-rural or other customers to use wireless, satellite, TV, or DSL or other wired networks to effectively meet their content demands, without the need for an additional high-speed cable or fiber network offering. Thus, large data content, including over-the-top content (OTT) video, software updates, and other large data, may be offloaded to be served by the present system while the lower speed content communication network serves users' real-time/live voice and data requests, that cannot be pre-positioned effectively, using peak or regular capacity, and thus the need for high-speed cable or fiber network offerings within the home may be eliminated so that expenses may be reduced. The system may also allow congestion on even high-speed cable and fiber networks, or any of the aforementioned networks, to be alleviated by combining content delivery through pre-positioning using the dormant capacity and subsequent use from local content stores and by serving users' real-time/live voice and data requests, that cannot be pre-positioned effectively, using peak or regular capacity, in a unified system. Further, this system may also increase the effective capacity of broadband networks by using a much greater portion, or the entirety, of a content communication network's capacity, by using the combination of dormant capacity for pre-positioning of content and subsequent use from local content stores, and peak or regular capacity for serving users' real-time/live voice and data requests. If content that is likely to be consumed by the user is pre-positioned at the local content store, or the intermediate device, and then served from the intermediate device, the need to instead use the content communication network on a real-time/live request basis is reduced, especially in peak hours. Pre-positioning of large data, including over-the-top video and software updates, frees the capacity of mobile and fixed broadband networks for other real-time content requests, real-time two-way communications, or other live content consumption, especially during peak times. By combining a pre-positioning, dormant capacity approach with a real-time voice and data request, peak or regular capacity approaches, lower speed broadband service providers may compete head-to-head with established cable or fiber providers while any of the aforementioned networks improve their performance by leveraging such a combination of approaches.

It is also desired for a system to be able to serve users requests from a first user for real-time consumption, using broadcast transmissions, not only when there are other users desiring the same content for real-time consumption (like in the case of the mode described in eMBMS), but also when there are other users who may desire this content for non-real-time consumption, in order to store this same content as in the first user's request in intermediate storage and then to access this content for real-time consumption but in the future, at a later time. When a first user requests to access content, instead of serving that first user's request using a unicast transmission, the system can instead serve that first user's request using a broadcast transmission, allowing that first user and any other user, desiring to access that content for real-time consumption, to real-time consume that content; while at the same time, the broadcast transmissions to be able to be received by devices of any and all other users addressable by the broadcast transmission for non-real-time consumption, to store such content in those devices and for such any and all other users to access such content directly from their devices for real-time consumption at some later time.

The system could further make determinations of when it is advantageous to serve a given first user's request using a unicast transmission, as unicast transmissions are today higher throughput and have higher spectral efficiencies than broadcast transmissions on the order of 50-1,000%, and when it is advantageous to instead serve such first user's request using a broadcast transmission, where even though a broadcast transmission may be 50-1,000% disadvantaged in throughput and spectral efficiency than a unicast transmission, there are more than 50-1,000% more users than the first user which would benefit from having this request be received and stored by their devices for non-real-time consumption, and accessed for real-time consumption at a future time. This could involve analysis of not just how many users may benefit, but the likelihood of how many users may benefit based on analysis of their usage preferences, the popularity of the content in the request, and the likelihood that the cost of serving those users using unicast transmissions at a future time will be greater than the cost of using a broadcast transmission vs a unicast transmission at the current time.

Further, such system could also include a mechanism for determining whether any given device should receive the dormant capacity broadcast and store the data for non-real-time consumption, or if it should simply let it pass by. This determination could be based on its current available storage, the content already stored on that device for non-real-time consumption, and the content scheduled to be delivered to that device for non-real-time consumption, and the relative value of such opportunistic broadcast data and the cost of receiving it and storing it versus the value of the content already stored on that device or scheduled to be delivered to that device for non-real-time consumption.

For example, a first user desires to watch a movie #1, which is a relatively popular film, and requests it to be delivered for real-time consumption. The system analyzes that only 10% of the users in the same area as the first user, have movie #1 already stored on their devices for non-real-time consumption, but that of the remaining 90% of the users, 70% of those 90% or 63% would have a high likelihood of consuming movie #1 at a future time if it was stored on their devices for non-real-time consumption. The system serves movie #1 to the first user using a broadcast transmission instead of a unicast transmission, while having the other 63% of the users in the area as the first user receive the dormant broadcast transmission and store movie #1 for non-real-time consumption by the 63% of the users. In the future, some of the users whose devices stored movie #1 for non-real-time consumption, request to watch movie #1 at some future times, and movie #1 is served to them directly from their devices instead of using the network.

In the present example, optimized usage of a multiplicity of resource types (storage, computing, networking), based on cost, performance and demand requirements is set forth. Traditionally, systems have looked at the resource types individually and one-dimensionally. For example, radio resource management focuses on optimal usage of RF resources based on service requirements, contentions between competing requirements and user Service Level Agreements (SLAs). Another individual resource typically considered is the management of fixed network resources, e.g., Software Defined Network (SDN) style approaches. Storage and compute management and cloud-based architectures have been considered individually.

In the present example a cohesive, a combinatorial use of such a diverse set of resources to facilitate cost-effective, performance-optimized delivery of content, based on user needs and demand patterns is provided.

While existing systems look to leverage in-network compute, storage and networking resources in a traditional cloud framework, this disclosure extends the concept to a "System as a Cloud" model—wherein resources (compute, storage and networking) can be interchangeably assigned and arbitraged across the entire system, including but not limited to the traditional cloud—processing and storage farms in the network core, wireless core network components and gateways, network edge nodes—such as base stations, access points/routers, small cells, cable edge boxes (e.g. CMTS), and the like, intermediate storage/caching devices, in the network or in the home or office, end user devices, e.g. smartphones, tablets, personal computers, and the like. This may include using the available storage of mobile devices as intermediate devices for non-real-time consumption, by applications of those mobile devices. This may also include using the available storage of the mobile devices for non-real-time consumption, by applications of other mobile devices completely separate from the first mobile devices. The present example determines, at any given time, the optimal combination of resources, across the entire system, to deliver content based on cost, performance and user demand considerations.

In the present system, wireless networking is used to enable orchestrated content distribution over a fabric of unicast and broadcast transmissions though one or more communication networks. A cohesive group of mechanisms is designed to enable optimal real-time and non-real-time content delivery, leveraging a continuum of broadcast and unicast delivery schemes in a coordinated manner, over any type of network available to the service provider. The system views any content transmission as a potential unicast or broadcast transmission, and makes continual decisions on choice of transmission mode. The dynamic blending of unicast and broadcast deliveries creates a "breathing" apparatus, where the decision to broadcast or unicast a transmission is continually evaluated in view of various user device conditions and network conditions. For example, various condition may be taken into consideration such as user behavior, consumption and content popularity metric, spectrum efficiency of each transmission choice, available capacity in all accessible networks, network loading levels and the criticality of fulfilling real-time versus pre-positioned requirements.

The content distribution system or distribution system leverages the right mix of unicast and broadcast transmissions through the wireless network to cover communicating content to the user devices efficiently (with optimal use of radio resources), while delivering an optimal quality of user experience.

The delivery set forth herein is performed for a variety of delivery and consumption. For example, content delivery may be performed for live streaming. Live streaming is when multiple users view the live stream in real-time (at the same time). Some devices may also receive the live stream as part of content pre-positioning or caching for future real-time consumption from the cached location. Real-time content delivery, e.g., audio and video streaming, with an opportunistic broadcast. Real-time consumption by one user, with content pre-positioning or caching for future real-time consumption for any of the rest of the users. One example is set forth in U.S. Pat. No. 1,115,705 and is entitled "Method and System for Providing Non-Real-Time Content Distribution Services," the disclosure of which is incorporated by reference herein. Other use cases are for non-real-time consumption scenarios where content is pre-positioned or cached for future real-time consumption by users.

At the same time, the distribution system uses the most suitable network to deliver its content through, taking into account the capabilities of the networks it has access to, and the cost of delivering through each network. All of this is done "over-the-top", i.e., at the content distribution layer, which works above the IP layer. In contrast to the more transport-layer schemes adopted by wireless networks, this approach enables the system to be cognizant of application/content level popularity, usage and delivery success characteristics. The distribution system is far more aware of aspects like the assets it is delivering, device consumption patterns with response to the assets, asset popularity levels, etc., than traditional broadcast functionalities that sit at the transport layer and are simply purveyors of this content.

By gathering performance feedback or radio metrics from devices, the distribution system is further able to adjust its decisions on delivery mode to be used (broadcast vs. unicast). For example, the broadcast mode may be enabled if the distribution system determines there are sufficient participating devices experiencing radio conditions better than a defined threshold. Additional users can be pulled into the broadcast segment of an ongoing transmission, if those devices exhibit radio conditions better than the defined threshold. In this manner, the system always selects the most spectrally efficient mode of delivery. One consideration in the selection of the most spectrally efficient mode is the consumption pattern. The consumption pattern may include how many user devices need something now, how many user devices are predicted to need the content in the future, and how much cache do they have to store the content.

Another consideration is spectral efficiency. Spectral efficiency to determine the efficiency of the spectrum used for each transmission choice. By determining the spectrum efficiency of each transmission choice, the appropriate transmission resources such as the network, the distribute type, the compute and the storage may be determined appropriately. The spectral efficiency and the capacity together with other data are used for making the selection of the appropriate resource at the content distribution system 12.

A comparative spectral efficiency of delivering content via unicast or broadcast is performed. Further, a comparative spectral efficiency of delivering content using different mixes of unicast and broadcast may also be performed using different proportions (percentages) of available capacity for broadcast and unicast and accommodating different sizes of user groups for broadcast and unicast. That is, a broadcast utilization goal and a unicast utilization goal for portions (or percentages of) the available capacity may be determined. In some examples, the total goal of the available capacity may be some percentage less than the total available capacity. The difference may be referred to as a capacity margin, which allows the system to have the capacity to support unexpected increases in real time traffic. Lastly, the relative "rigidity" of unicast vs. broadcast in precluding support of real-time traffic in a sufficiently dynamic manner. Further details are provided below. The available capacity may be associated with a specific time period such as a time period of certain minutes of a day.

Figure 1:
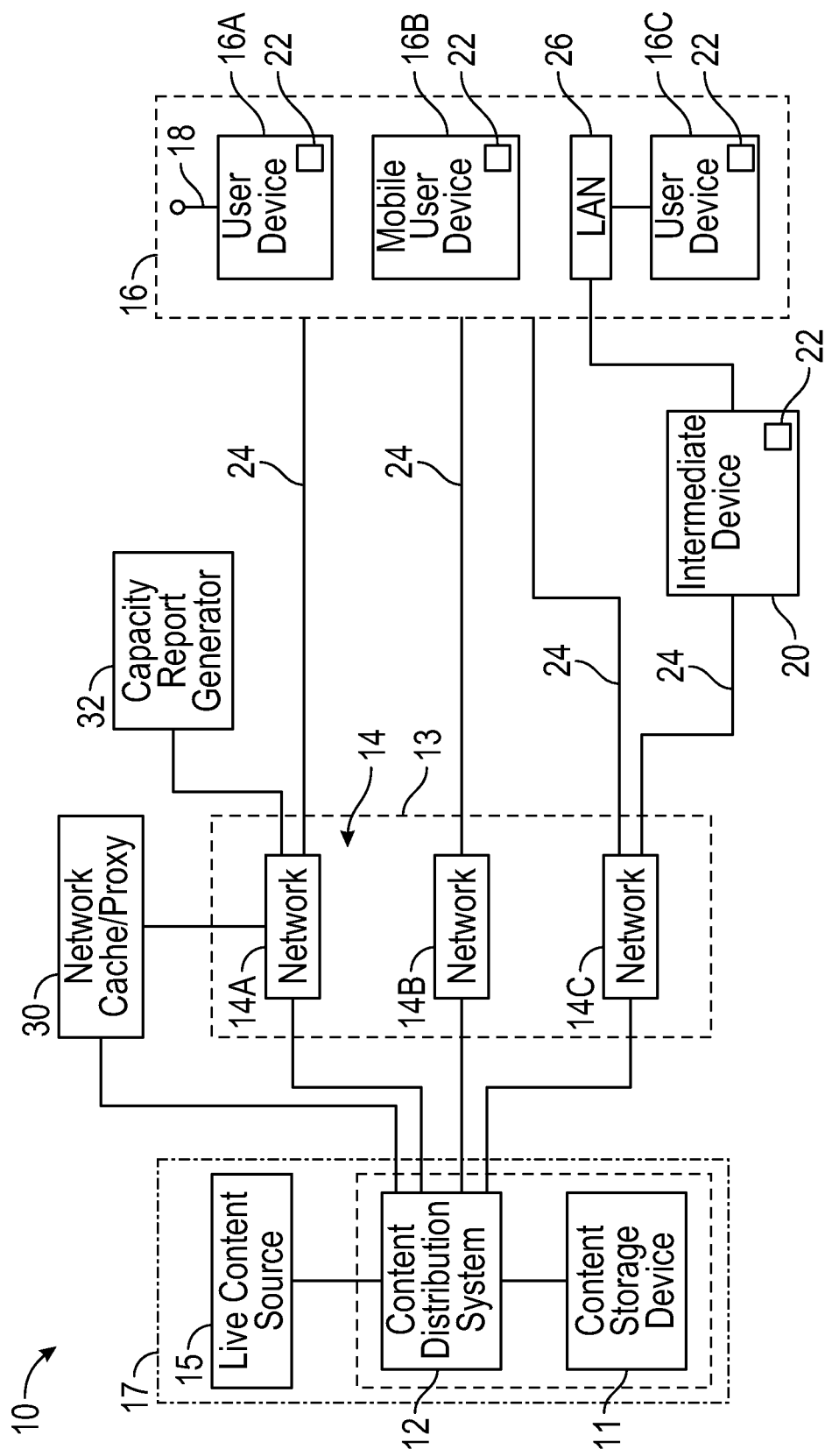
FIG. 1 is a high-level block diagrammatic view of a communication system.

Referring now to FIG. 1, a high-level block diagrammatic view of a communication system 10 is set forth. The communication system 10 includes a content distribution system 12 that may be referred to hereinafter as a distribution system. The content distribution system 12 is used for communicating content that is stored in a content storage device 11 that may be located within the content distribution system 12 or accessible by the content distribution system 12. In general, the communication system 10 is suitable for pre-positioning content or distributing real-time live content from one or more live content sources of which one live content source 15 is illustrated. The live content source 15 is in communication with the content distribution system 12. The content distribution system 12 may be controlled by a dormant capacity communication system 17 and the dormant capacity system operator thereof.

The content distribution system 12 is in communication with one or more communication networks 14 operated by one or more network operators 13. In this example, a communication network 14A, a communication network 14B and a communication network 14C are illustrated. The communication networks 14A-14C may be collectively referred to as the communication network or networks 14. The networks 14 are in communication with a plurality of user devices 16. In this example, a first user device 16A has an antenna 18 for communicating with the network 14. The user device 16A may be a stationary user device. The stationary user device may be a desktop computer, a set top box, a gaming unit, a server, a television, an internet of things device and the like.

The user devices 16 may also include a mobile user device such as cellular phone, a tablet computer, a laptop computer, an internet of things device and the like.

The user device devices may also include a user device 16C that is in communication with an intermediate device 20 through a local area network 26. The intermediate device 20 and the user devices 16 may also collectively be referred to as a user device 16. The intermediate device 20 and the user devices 16A-16C may have a memory 22 associated therewith. The memory 22 may be used for storing various operating parameters as well as content. That is, content may be pre-positioned within the memory 22 of the user devices 16A-16C and the intermediate device 20. In the case of the user device 16C, the intermediate device 20 may have content pre-positioned from the network 14.

The networks 14A-14C may be one of various types of communication networks. The networks 14A-14C may be a wireless communication network. Examples of wireless communication networks include cellular telephone system, satellite systems, over-the-air digital television broadcast networks, a WiMAX system and the like. The networks 14A-C may be operated by a single network operator or entity or a plurality of network operators or entities. The dormant capacity communication system operator may be used to control the communication of content through the dormant capacity of the network. In some cases, the network operator may be the operator of the dormant capacity communication system 17.

Each of the networks 14A-14C may include a network cache/proxy 30. The network case/proxy 30 may receive content from the content distribution system 12 that is to be distributed by the networks 14A-14C. Only one network cache/proxy 30 is illustrated. However, each network 14A-14C may have an associated cache/proxy.

The network 14 may also be associated with a capacity report generator 32. The capacity report generator 32 may generate the dormant capacity available from each network. The dormant capacity was described above as capacity not being used for the primary service of the network. In a cellular network, voice traffic may be a primary type of content as well as providing customers with real time data. Any data capacity not being used may be referred to as the dormant capacity. The unused capacity of the networks 14A-14C may be used by content distribution system 12 for distributing content therethrough. The amount of dormant capacity may change over time. Therefore, the capacity reward generator 32 may provide an indication of the time associated with the dormant or unused capacity. The capacity report generator 32 may also predict the future unused capacity based on operating data of the system.

The capacity report generator 32 may provide data available capacity in various forms to the dormant capacity communication system 17 (the operator associated therewith). For example, the capacity report may include at least some of capacity used by user traffic associated with the network operator, total capacity of the network, capacity used by the dormant capacity content provider, and total capacity used by any traffic whether user traffic associated with the network operator or the capacity used by the dormant capacity communication system 17.

In one example, the available capacity may be determined by subtracting from the total capacity of the network, the capacity used by regular user traffic associated with the network and the capacity used by the dormant content provider. The available capacity may be the dormant capacity. As mentioned below some margin may be maintained to the dormant capacity is not fully utilized so sudden usage spike s of users associated with the network operator can be accommodated. The amount to be used or available to be used within the margin may be referred to as a target available capacity utilization goal.

The capacity used by the dormant capacity content provider may be determined by estimating the capacity used by dormant capacity content provider given the throughput sent to user devices over a period of time and the spectral efficiency of the user devices to which the dormant content provider communicates content.

The available capacity may, for example, be provided in spectrum (bandwidth) frequency. For example, 10 MHz of 30 MHz are available. Conversely, 20 MHz of 30 Mz are used. By subtraction 10 MHz are available. The number of physical resource blocks (PRBs) may also be provided in a similar way. That is, the number of PRBs used out of the total of PRBs or the number available PRBs may be provided.

Figure 2:
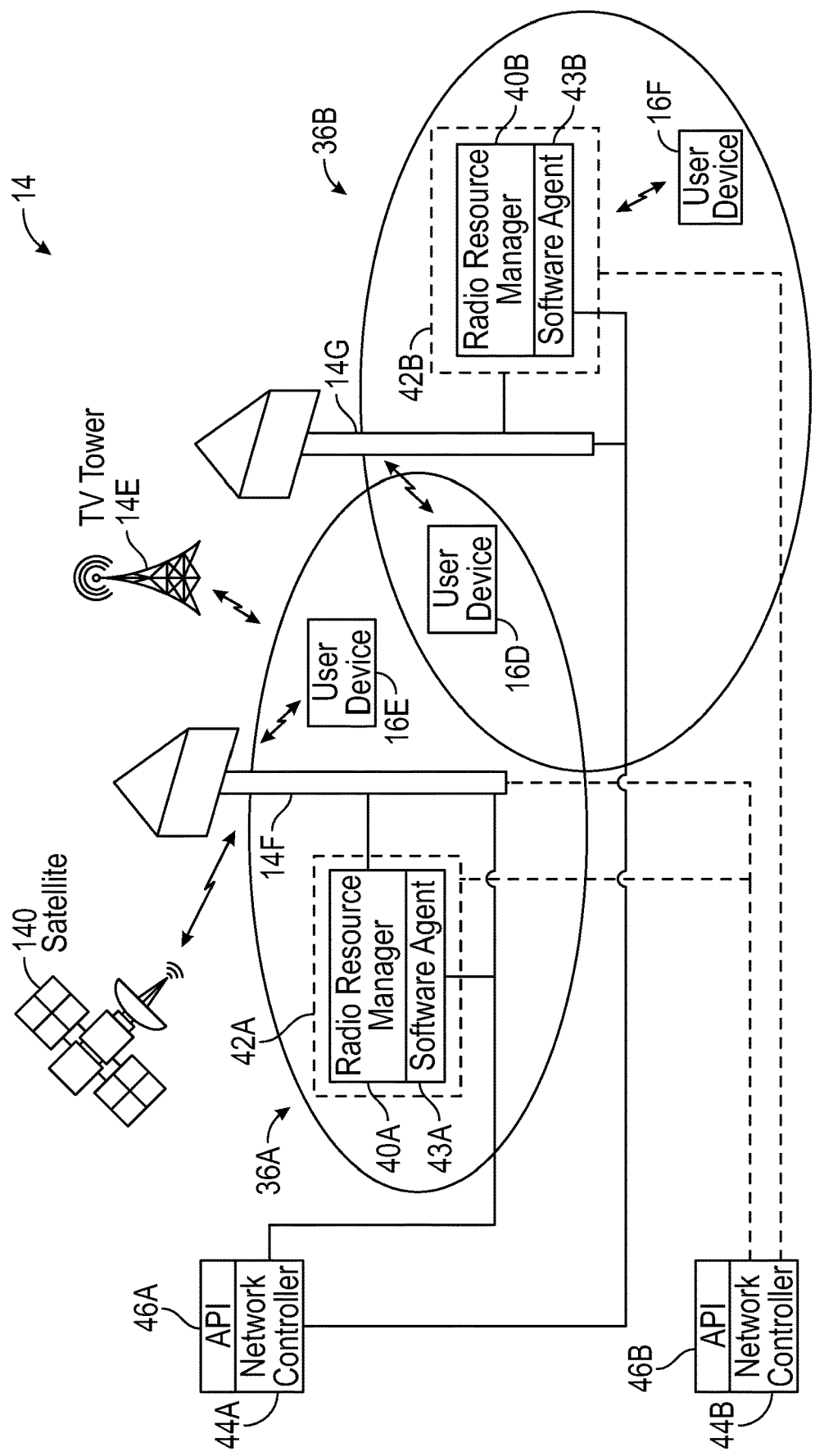
FIG. 2 is a block diagrammatic view of the cell level of the communication system of FIG. 1.

Referring now also to FIG. 2, the plurality of networks associated with the user devices 16 is set forth. The user devices 16 each may be one of the varieties of user devices described above.

The content distribution system 12 may use one or more network resources to communicate content to the user devices 16. The content distribution system 12 may, for example, provide a service that may be use one or more networks 14 to communicate a particular piece of content. The content may be communicated partially through one network while another part of the content may be communicated through another network. In FIG. 2, a satellite network represented by the satellite 14D is illustrated. The network is a TV tower 14E. During satellite communication, all of the transponder bandwidth may not be used. Therefore, in a satellite 14D, the excess bandwidth may be used to communicate content from the content distribution system 12. Likewise, the TV tower 14E may have a predetermined amount of bandwidth associated therewith. The bandwidth may not be completely used and therefore the content distribution system 12 may provide content through the excess bandwidth of the TV tower. Cell towers 14F and 14G may be from the same service provider or different service providers. The cell towers 14F may broadcast or unicast data using one or more technologies. For example, 3G, 4G, 5G or LTE may be used as a technology for communicating content from the cell tower 14F, 14G. The cell towers 14F, 14G may thus have one or more antennas that communicate using one or more technologies. A high-level representation of service coverage of two cells 36A, 36B correspondingly respectively to the cell towers 14F, 14G is set forth. The cells each have two boundary lines that represent the transmission of two different technologies. The cells 36A, 36B also have an overlapping portion in which the user device 16D is provided. As will be described in more detail below, the service to the user device 16D may aggregate different technologies and different service providers. For example, the user device 16D may use two different technologies from the same cell tower 14F or 14G. For example, 4G and 5G may be used to communicate content to the user device 16D from the cell tower 14G. In addition, cell tower 15F may communicate with one technology, such as 4G, and cell tower 14G may communicate with another technology such as 5G. The cell towers 14F and 14G may be owned by different entities and thus may not be related. The content distribution system 12 may contract to use excess capacity from different network providers. User device 16E may be located within one cell only reachable by signals from the base station 42A, 42B. However, multiple technologies may be used to reach or communicate content to the user device 16E. The same is true for user device 16F. For user device 16F, signals from the cell tower 14G are used to communicate content thereto. Of course, different technologies provided from the different cell towers 14F, 14G may be used to communicate with the user devices 16E, 16F.

In all cases, other networks, such as the satellite 14D and TV tower 14E, may be used in addition to the cell towers 14F, 14G to communicate content to the user devices 16D-16F.

Each cell tower may have a radio resource manager that is part of a base station 42A, 42B, respectively. The radio resource manager provides a scheduling function to the base station 42A and may be used to determine the target throughputs based on the available capacity and the radio link quality as will be described in further detail below. That is, a broadcast utilization goal and a unicast utilization goal for portions (or percentages of) the available capacity) may be determined. The utilization goals may be referred to individually or collectively as a target available capacity utilization goal. In some examples, the target available capacity utilization goal may be some percentage less than the total available capacity. The percentage may be set by the network operator. The difference between the total available capacity and the target available capacity utilization goal may be referred to as a capacity margin. The margin allows the system to have the capacity to support unexpected increases in real time traffic. A target available capacity utilization goal of the first network may be determined based on the available capacity by identifying a desired total network loading by all network traffic (both dormant and traffic associated with a network operator), or achieving a network loading having a predetermined margin of available capacity unused.

The base station 42A, 42B may be in communication with a network controller 44A, 44B. Should the base stations be controlled by a single entity, the network controller 44A may control the base stations 42A, 42B as part of the same network. However, the base stations 42A, 42B of the cell towers 14F, 14G may be controlled by different entities and thus a second network controller 44B is set forth. The network controller 44B may also be used to control either of the base stations 42A, 42B or one of the base stations. An application interface 46A is associated with the network controller 44A and an application interface 46B is associated with the network controller 44B. The application interface 46A, 46B may be used to receive and transmit various data to the content distribution system 12. Further functioning of the application interface and the network controllers are described in further detail below.

In general, the content distribution system 12 uses knowledge of the radio links 24 and the operation of all of the networks it is associated with to determine and orchestrate the content distribution in an effective manner. Previously known systems do not have knowledge of various different types of networks and the resources within a network. The present system advantageously uses this knowledge in order to communicate content.

In step 310, content to be communicated to one or more user devices 16 or to one or more intermediate devices 20 is identified. A plurality of different content including different content types may be identified by the content distribution system 12 based upon various criteria including popularity, the time of day and the like.

In step 312, radio quality metrics for each of the links 24 may be communicated to the content distribution system 12 through the radio resource manager 40A, 40B of each base station. For other resources, the radio quality metrics may be provided by the network provider, such as the TV tower provider and the satellite system provider.

In step 314 a network is selected as described in more detail below. The network selection may be based on various data.

In step 316, determining whether to broadcast or unicast the content is determined. Unicasting may take place when one or very few devices are requesting the particular content. Broadcasting may take place when a live stream is to be communicated to a plurality of different user device. Broadcasting may also take place when one user device requests content for immediate real-time use and a number of other devices also desire to use the content in the future (non-real-time for memory). The communicated content may be stored for later use by the user devices or intermediate devices not viewing the content in real time. It should be noted that the feedback from the various user device may be used to determine various recovery actions and adjust the delivery algorithms during the process. This is described in further detail below.

In step 318, a target throughput is determined for communicating content to various user devices and the intermediate device. The target throughput is a bit rate that is determined based upon the radio channel quality metrics that are communicated back to the content distribution system. Ultimately, the content distribution system determines the target throughput which is individualized for each of the user devices. That is, different target throughputs may be calculated for the communication of content through the various networks.

Step 326 determines the capacity available in various networks. Dormant capacity may be used to communicate content through the various networks. Identification of the dormant capacity is provided in further detail below. The target available capacity utilization goal may be used rather than the full available capacity. The target throughput may take the target available capacity utilization goal into consideration and not the entire available capacity.

In step 328, the networks 14 may provide a communication time associated with providing a content to the user device. That is, over time the network learns the busy times and slow times for communicating regular content and user of the system. The dormant capacity may thus be timed by measurements from either the network controller 44A, 44B or the radio resource managers 40A, 40B or both.

In step 330, multiple networks, multiple cell sites, multiple technologies may be aggregated based upon the radio quality metrics associated with the links to the user devices.

Ultimately, in step 332 content is communicated based upon the selections and determinations set forth above. The content is communicated using the various network resources selected by the content distribution system 12. For example, the timing for a mobile device may be such that content is only communicating using stronger radio conditions.

In further detail, the wireless networks 14 know the available wireless network capacity and the quality of the link or links 24 connecting the network or networks 14 to the user devices 16. For example, in 4G or 5G systems, the radio resource manager 40 and the associated scheduling function in the base station 42 determines target throughputs for each user device 16 based on available capacity (or the target available capacity utilization goal) and radio link quality.

Available capacity relates to the running level of contention for radio resources, i.e., the number of devices contending for the radio resources within a cell. The higher the level of contention for radio resources, the lower the amount of bandwidth each user device is able to have allocated in terms of radio resource allocation (and hence throughput) since the total quantum of radio resources available in a cell 36 (or supported by a base station 42 or access point) is finite and has to be shared across contending user devices 16.

Radio link quality is the other factor used to determine achievable throughput. The higher a device's radio channel quality, the higher is the spectral efficiency that can be applied to transmissions to the device, and hence the greater the throughput.

In cellular wireless systems (e.g., 4G, 5G etc.) the functions of radio resource allocation and throughput determination based on a device's radio conditions is determined by the radio resource manager 40 in the wireless base station 42. As described in further detail below, the communication system 10 cross-layers radio capacity and quality specifics into the distribution system 12 to enable the distribution system to accurately target throughputs based on the parameters. In essence, this cross-pollinates some radio management aspects into the distribution system. Hence a content distribution system 12 based out of the cloud is able to integrate radio management and scheduling intelligence into its content delivery algorithms.

The provider entity of the distribution system 12 has access to multiple types of distribution networks 14. The user devices may also be capable of accessing content via a multiplicity of networks. Consequently, the content distribution system 12 can leverage the same radio knowledge regarding the available capacity (or the target available capacity utilization goal) in each candidate network and the user device's radio channel quality over each available network to choose the best network to deliver content over. Aggregation of resources may be performed when multiple networks may simultaneously be accessed to route content of portions of content through. Aggregation naturally falls outside the jurisdiction of any individual network; and naturally under the purview of the governing content distribution system 12.

Pre-Positioning

Content resource selection and aggregation of content may be used to communicated stored content and to live stream content. Storing content for later use is referred to as pre-positioning. Pre-positioning content occurs with the knowledge that the content is not immediately needed to be viewed and therefore the system can store such content at an intermediate device or user device according to network resource availability. Video data traffic is typically carried over wireless networks at the same time, as when consumers desire to consume such video data traffic. Since consumers consume data traffic at times driven largely by social structures, with significant consumption happening at the same time across the consumer base including during "prime time" hours, time intervals of significant "peak" consumption are typical and wireless networks often have insufficient capacity to handle such peak loads. Further, consumers mostly consume different content than other consumers at any given point of time, precluding efficient use of broadcasting content to users for real-time consumption outside of select live content (i.e., sports events, time-scheduled releases of popular shows). Consumers consume largely the same long-form content (i.e., blockbuster movies and hit TV series) as other consumers, over a longer period of time, so it is possible to "predict" what a consumer would consume with higher accuracy if the real-time requirement were relaxed to another time quantity such as "over 3 months" or some other such longer than real-time timeframe. As mentioned above in step 310, the system that identifies the content generally desired by consumers, distributes such content over the network in advance of the time it is desired to be consumed by consumers, stores such content locally at the consumers' premises, and serves such content to consumers over an unconstrained medium (i.e., home WiFi network), would be able to relieve wireless networks from significant amount of video data content and corresponding congestion. Further, if such a system performed its distribution during times when the wireless networks had "spare capacity", not needed for real-time traffic needs, the system would be able to relieve wireless networks even further. This is referred to as pre-positioning, which is when, the content distribution system 12 uses the network's dormant capacity to offload content, and hence free up the network's live or real-time capacity. As mentioned above, the ideas within this innovation equally apply to any kind of downloaded data or content, e.g., files and data transferred to and stored on the user device.

Leveraging Radio Quality Metrics

In step 312, the content distribution system 12 receives the radio channel quality metrics of the links 24 from the various networks 14 and, in particular the base stations 42 and the radio resource managers 40 to decide on aspects such as the throughput (bitrate) to be targeted for the content delivery through the wireless network. The radio channel quality level may also be used to determine and select which network or networks are the optimal network to use for optimal delivery efficiency in step 314. More than one network may be selected when the content distribution system 12 and the user devices have access to a multiplicity of networks.

In step 316, the delivery mechanism to use such as unicast or broadcast may be determined. For example, the selection of the delivery mechanism may be a function of radio quality metric data such as the signal strength and signal-to-noise ratio measurements. Additionally, the delivery mechanism may also be selected based as a function of radio quality metric data such as round-trip latency, jitter, the signal interference to noise ratio or the channel quality indicator (CQI). The inclusion or exclusion of a user device from a broadcast group may be based on conditions of the link to the user device. Monitoring various conditions or radio quality allows only devices that have a high enough radio conditions to reliably receive the content to be considered to receive the broadcast signal.

The radio quality measurements can be collected in various ways such as by having the participating user device collect the radio metrics (e.g., from a modem processing unit in the user device) and conveying them (over-the-top) to the content distribution system 12 functionality located at the other end of the Network. The user devices 16, in many ways, provide the best detection of radio quality, since it is able to quantify the precise quality of experience it is receiving. By deploying software agents 43A, 43B in the radio access network, e.g., at the cell level as illustrated in FIG. 2 or example, in an eNodeB in a cellular network, the agents 43A, 43B provide a variety of network-side measurements, including radio resource usage information, directly to the content distribution system 12. The content distribution system 12 leverages the metrics to coordinate its capacity management. For example, the content distribution system 12 then uses signal strength data and or signal-noise ratio measurement data to derive the appropriate modulation and coding scheme (MCS) level that the radio network may use to deliver content to a given user device 16. Using this projected MCS level, a dormant capacity control protocol (DCCP system described in more detail in FIG. 9) can better quantify a target throughput to be used for each of the user devices 16.

Determining Target Throughput—Unicast Delivery—Based on Radio Channel Quality Metrics In step 318 the case where the content distribution system 12 uses unicast mechanisms to download content to a user device or pre-position content on a device for future consumption by the user, the content distribution system 12 can use knowledge of available network capacity and the device's radio channel quality to determine the right throughput to target to deliver content to the device. The throughput to be targeted depends on both capacity available and the radio channel quality of the user device 16. The larger the available bandwidth, the larger the number of resources the content distribution system 12 can use. The better the target device's radio channel quality, the higher is the possible spectral efficiency (expressed in bits/s/Hz) that can be applied to the transmission. The product of the two determine target throughput. That is:

Target Throughput=Available spectral capacity(Hz)× spectral efficiency(bits/s/Hz)

The available spectral capacity (spectrum) is determined by the content distribution system 12 based on the received capacity reports from the network. As mentioned above, the available capacity may be reduced by a margin to the target available capacity utilization goal. Capacity usage reported by the network could be expressed as % of total channel (e.g., cell) capacity; in which case, spectral capacity (Hz) can be derived by applying that percentage against total spectral capacity (Hz) available in the channel (or cell). The spectral efficiency level that is tolerable by the device (tolerable spectral efficiency) may be determined based on the radio channel metrics gathered from the device. The content distribution system 12 uses the radio channel quality of the device 16 (measured by signal strength, signal/noise-interference ratio (SINK), channel quality indicators, and other similar metrics) to determine a target modulation and coding scheme (MCS) level for the device. The mapped MCS level reflects the highest modulation order to that the particular device, in its current radio conditions, can reliably demodulate; as well as the level of channel coding (forward error correction) that needs to be applied to correct errors. The determined MCS level can be directly translated to a spectral efficiency data value, and the content distribution system 12 combines spectral efficiency with available capacity (as outlined earlier) to target throughput. Note the target throughput may be determined for each device individually based on the radio conditions at each of the particular devices. In the present system all of the determinations may be done in the cloud (by the content distribution system 12) which effectively integrates radio quality information with content distribution specifics as a cross-layer optimization.

Determining Target Throughput—Broadcast Delivery—Based on Radio Channel Quality Metrics If the content is to be pre-positioned on a number of devices via broadcast delivery, the content distribution system 12 uses radio channel quality metrics collected from all devices participating in the broadcast, e.g., in the cell or service area covered by the broadcast. The content distribution system 12 selects an MCS level (and corresponding spectral efficiency value) for the broadcast that maximizes aggregate throughput obtainable for the broadcast, across the participating devices. This becomes a linear optimization problem of optimizing the mix of the number of devices included in the broadcast group based on the spectral efficiency that can be applied to transmissions to the group. A balance between the whether to broadcast to a smaller group of devices with much better radio conditions (hence, with a higher spectral efficiency), and delegate the other devices to unicast, vs. transmitting to a larger broadcast group with a lower spectral efficiency. The linear optimization balances the right mix that produces the highest throughput and overall spectral efficiency. The linear optimization levels may be design parameters that vary based on thresholds for acceptable radio conditions for the system. The system design balances competing goals of more broadcast devices and the likelihood the devices receive the content. One consideration is whether creating a smaller broadcast group of devices in high-fidelity conditions (receiving a higher spectral efficiency, higher throughput) maximizes system throughput. Another consideration is whether creating a larger broadcast group of devices, some in slightly weaker radio conditions, and broadcasting with a lower spectral efficiency, produces a higher throughput product. The considerations take into consideration that the broadcast inherently delivers higher overall spectral efficiency, since the same set of radio resources is being used to serve a large number of users. Here, the higher throughput per user would be sacrificed to serve more users and achieve a higher broadcast throughput product.

Figure 4:
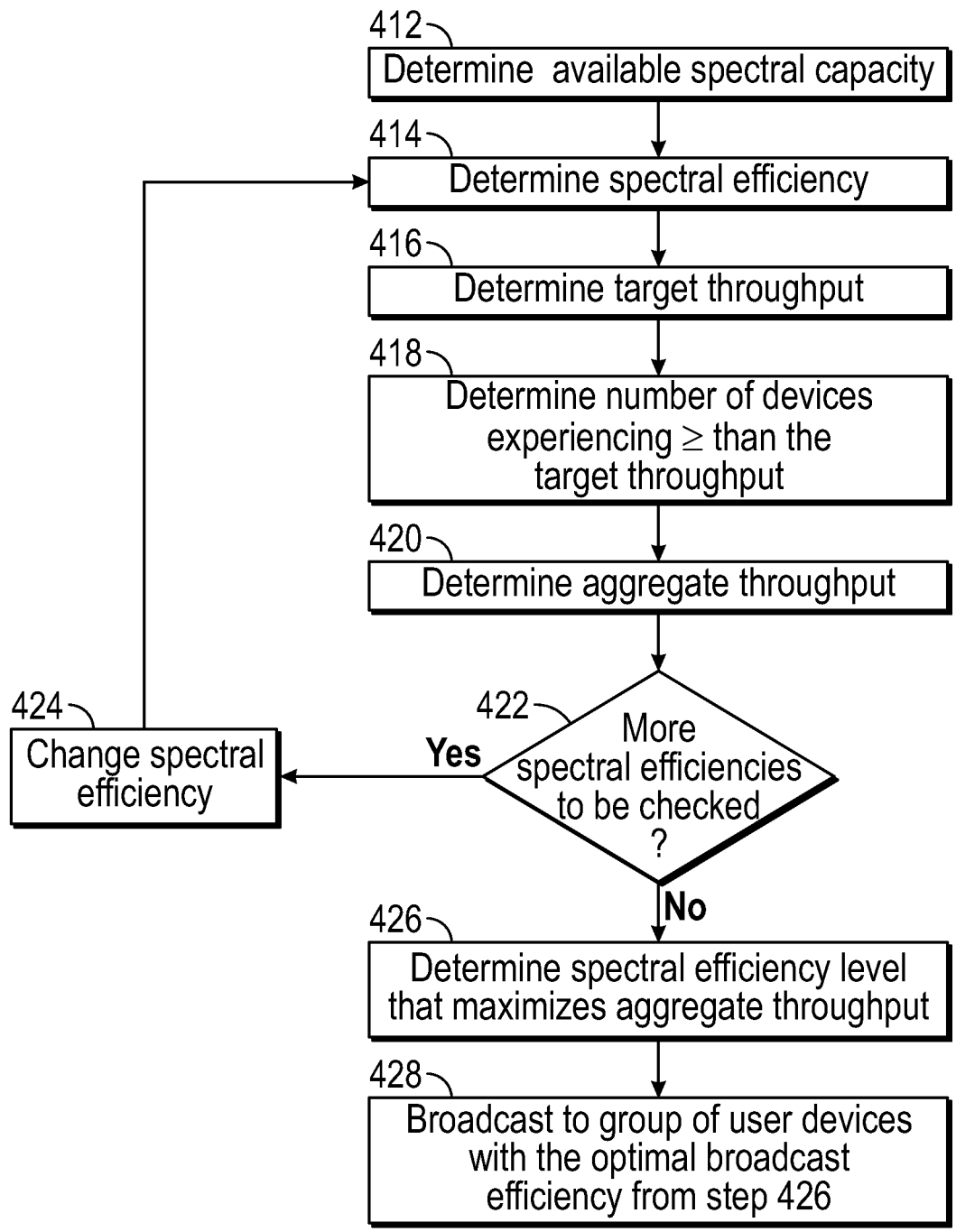
FIG. 4 is a flowchart of a method for communicating to devices with similar spectral efficiencies.

Referring now to FIG. 4, a method for selecting broadcast devices may perform the following iteratively for various spectral efficiencies. FIG. 4 ultimately determines the broadcast group size, spectral efficiency level, and aggregate throughput (if broadcast were to be used). The logic in FIG. 5 ultimately decides between broadcasting and unicasting. In step 412, an available spectral capacity for the network is determined. In step 412 a spectral efficiency is selected. That is, a first spectral efficiency from a plurality of efficiencies to be tested is determined. In step 416 a target throughput is determined using the following:

Determine Target Throughput=Available spectral capacity (Hz) x spectral efficiency (bits/s/Hz) (The Target Throughput would apply to each device that is able to receive the broadcast.) Again, the target available capacity utilization goal may be used as the available spectral capacity rather than the full available spectral capacity.

In step 418, a number of user devices 16 that are experiencing radio conditions at least as good as required to receive delivery at this target spectral efficiency level is determined. (The rest of the devices will receive little or none of the broadcast).

In step 420, the aggregate throughput is determined. The aggregate throughput is the number of devices×target throughput.

In step 422 if more efficiencies are to be checked, step 424 changes the spectral efficiencies and steps 414-420 are performed again. The logic for each candidate spectral efficiency level (using a linear programming or simple machine learning tool could apply this to a continuum of such reference data points). When all of the selected spectral efficiencies have been performed in step 422, step 426, determines the spectral efficiency level that maximizes aggregate throughput. The spectral efficiency of step 426 may be referred to as an optimal spectral efficiency level and may be used for the broadcast to maximize delivery efficiency. A higher selected spectral efficiency would typically result in a smaller set of devices being included in the broadcast; and vice versa for a lower spectral efficiency—larger device coverage. The tradeoff is between transmitting to a large number of devices at a lower throughput, vs. to a smaller set of devices at a higher throughput. The present system provides a scheme for optimizing broadcast transmission based on radio metrics by using a content distribution system 12 performing the determination in the cloud. The system effectively integrates radio quality information with content distribution specifics as a cross-layer optimization.

After step 426, step 428 uses the optimal spectral efficiency is used to determine the broadcast group of user devices to which to communicate the content. That is the system broadcasts content to the group of user devices with the selected spectral efficiency.

Determining Delivery Mechanism—Unicast Vs. Broadcast—Based on Radio Channel Quality Metrics Referring now to FIG. 5, the content distribution system 12 can also use radio channel quality metrics to determine and decide on a broadcast or unicast delivery mechanism to be used on a case-by-case basis. That is, the content distribution system 12 may be used to determine the highest overall spectrally efficient transmission delivery mechanism (unicast vs, broadcast) given the radio conditions of the participating user devices. The content distribution system 12 evaluates overall spectral efficiencies for both broadcast and unicast approaches.

With unicast, radio resources (e.g., carrier frequency slices allocated across time slots and spatial layers) are allocated to each device, typically on a delivery-by-delivery basis. In other words, radio resources are allocated per device delivery. Some devices may be in radio-advantaged conditions (i.e., higher SNR/SINR/CQI), and, consequently, use fewer radio resources to achieve a given target throughput (i.e., are more spectrally efficient). In contrast, devices on poorer radio channels will end up using more radio resources to achieve the same target throughput desired for delivery of the content in question.

With broadcast, the same set of radio resources is shared across all participating devices (for example, on a cell in a wireless system). Individual per-device radio resource allocation does not happen. Also, a common spectral efficiency level is used for data delivery across a session—to all participating devices. This is typically at a "middling" level (it can even be at a "least common denominator" level) so that a large enough number of devices can receive the broadcast successfully. Devices 16 that are radio-disadvantaged enough to not tolerate the target broadcast spectral efficiency level will receive little or none of the content. Hence, a highly spectrally efficient unicasting device (i.e., having better radio conditions, and by itself, achieving throughputs with fewer radio resources) will typically experience a lower spectral efficiency when moved over to broadcast. On the other hand, the radio resource sharing feature of a broadcast raises overall spectral efficiency since more devices are being served using the same quantum of spectrum.

The tradeoff between drop in per-device spectral efficiency for radio-advantaged users and increased spectral efficiency from resource sharing becomes a factor to assess while making the unicast vs. broadcast choice.

In FIG. 5 a determination of whether to use unicast or broadcast delivery to a given population of devices is set forth. In FIG. 4 the optimum broadcast group size, spectral efficiency level, and aggregate throughput (if broadcast were to be used) is determined. The upper portion of FIG. 5 is performed for a unicast broadcast method. In step 510 for each device a radio channel quality for a user device is determined. The radio channel quality for the user device may be measured by signal strength, signal/noise-interference ratio (SINK), channel quality indicators, and other similar metrics. In step 512 a target modulation and coding scheme (MCS) level for the device is determined. In step 514 the MCS level is used to determine a spectral efficiency value for the device. The MCS may be mapped to the spectral efficiency value.

In step 516 an available spectral capacity or the target available capacity utilization goal is determined. In step 518 a target throughput is determined as a function of the available spectral capacity of step 516 and spectral efficiency of step 514 by:

Calculate Target Throughput=Available spectral capacity (Hz)×spectral efficiency (bits/s/Hz) Again, the target available capacity utilization goal may be used rather than the full available capacity.

In step 520, determined whether all the devices under consideration have target throughputs determined by steps 510-518. When all the devise under consideration have not been calculated steps 50-518 are repeated. When all the devices have had their target throughput determined in step 520, step 522 is performed. In step 522, the sum of all the target throughputs is determined by:

Aggregate Throughput(for unicast)=SUM(all user device target throughputs)

In step 524, the unicast aggregate throughput to the aggregate broadcast throughput for the optimum broadcast group are compared. When the unicast aggregate throughput is greater than the broadcast aggregate throughput in step 526, unicasting is used to communicate content to the user devices in step 528. When the unicast aggregate throughput is not greater than the broadcast aggregate throughput in step 526, broadcasting is used to communicate content to the user devices in step 530.

Another aspect of the operation of the system is leveraging the performance feedback from the user devices 16. The system and method described herein uses feedback from the user devices related to prior deliveries to derive delivery success and failure metrics. The feedback can be used to determine next steps, e.g., retransmission of content segments that were not successfully received by the devices. Feedback from the user devices may also be used to adjust and tune algorithmic settings to enhance the efficiency of the distribution and delivery mechanisms. The feedback may be used for unicasting or broadcasting. In the case of unicast, for example, the target device's spectral efficiency or throughput ratio metrics can be adjusted as a function of the feedback. In the case of broadcast, the broadcast spectral efficiency level, and associated broadcast group size, can be adjusted as a function of the performance feedback.

Over-the-Top Protocol for Content Distribution Management

Referring now to FIG. 6, a signal diagram is illustrated that shows a system and method may use an over-the-top (Application Layer) protocol to coordinate the content distribution and delivery process. The protocol communicates needed content delivery parameters (timing, what content to pull, target throughputs, location etc.). The protocol is also used by the device to report delivery performance feedback.

The content distribution system 12 periodically (regularly) receives radio channel quality metric data signals 610 from the user devices 16. The metric data in the metric data signals indicate the quality of the link in the form of signal strength reading data, signal-to-interference/noise ratio measurement data (SINR). Additionally, the device may provide metrics such as round-trip latency and achieved throughput. From the radio quality metrics, the content distribution system 12 is able to calculate the spectral efficiency level that can be applied to transmissions to this device (described in earlier sections).

The content distribution system 12 also periodically receives capacity usage report signals 612 from the networks 14A-14C. Exemplary report signals comprise data that include but are not limited to cell capacity usage reports indicating the number of percentage of radio resource blocks used by traffic in a cell (e.g., Physical Radio Blocks or PRBs in a 4G or 5G system). From the capacity usage reports, the content distribution system 12 is able to assess available capacity in the system, e.g., on a cell-by-cell basis in a 4G or 5G system. Further, the target available capacity utilization goal may be determined.

In step 614 a scheduling function of the content distribution system 12 schedules a device for content delivery. The scheduling function can determine which content assets are scheduled for delivery to this device, their locations within the content distribution system 12 and the like.

In step 616 the content distribution system 12 determines the target throughput to be applied, based on available spectral capacity and the device's tolerable spectral efficiency level as described above.

The content distribution system 12 issues a content delivery notification signal 618 to the target device, providing data to the device for downloading one or more content assets. The notification signal 618 comprises data that indicates which content assets to pull in by way of a content identifier, the address or location of the content (e.g., URLs), target throughput the device should apply etc.

The device 16 pulls in the content from the designated locations, at the prescribed throughput (data rate) using a content pull request signal 620. The content could be pulled from an in-network cache or proxy device 30, which is located in or close to the wireless network. If the network cache or proxy device does not have the requested content, it can reverse proxy the request to the master (cloud) store at the content storage device 11 in the content distribution system 12 to fetch the requested content from there.

In step 622 the content gets delivered to the device 16 from the network cache proxy device 30 or the distribution system 12.

The device 16 provides a delivery (performance) feedback signal 624 to the content distribution system 12. Feedback signal 624 may include data concerning: assets (or byte ranges within assets) correctly received, missing assets (or byte ranges), achieved throughputs, error rates and the like. The content distribution system 12 may leverage this feedback to fine-tune/adjust its capacity management and delivery algorithms.

The interactions exemplified in FIG. 6 the device 16 and content distribution system 12 are part of the over-the-top content distribution protocol that orchestrates delivery of content to devices.

Determining Optimal Delivery Opportunities for Mobile Devices 16

Referring back to FIG. 3 and to FIG. 7, radio quality metric data can also be used to determine the best times at which to deliver content to the user devices 16. Mobile devices, in particular, may benefit from content being pre-positioned at or downloaded to a particular time. Step 710 determines whether the device is a mobile device. The device may be a mobile user device or an intermediate device. Mobile devices can slip in and out of good radio quality coverage conditions. Radio quality signal data from the mobile device is received by the content distribution system 12 in step 712. In step 714 when the time corresponds to when the user devices are within good coverage windows having good radio quality conditions, content may be communicated to those devices in step 716. This can be done so that throughput rates are maximized. In step 714 when the radio quality is outside the radio quality window, step 718 stops communicating content and another time when radio quality is within the radio quality window is determined in step 714. In general, the better the radio channel quality, the higher the throughput that is possible to target to the user device. Hence, by using the good coverage periods as delivery opportunities, overall system throughput can be maximized.

Stored Streaming Content (e.g., Audio/Video Streaming) Unicast Vs. Broadcast Considerations Referring now to FIG. 8, a related approach (unicast vs. broadcast determination) may be applied to real-time consumption of stored audio/video content, e.g., audio/video streaming. Stored streaming has different delivery and consumption dynamics. Here, a piece of content is pulled on-demand by a specific user at a specific time. It is not a live event that is time-synchronized across a population of viewers. Furthermore, even if multiple users are viewing the same content simultaneously, it is difficult to group them into a live broadcast session, since their views are not likely to be time-synchronized, i.e., at any given time, even two of the users are not likely to be at the same viewing point in the audio/video. Stored streaming views are therefore likely to be individually delivered and consumed. Hence, the nature of stored streaming demands unicast delivery by default. For purely unicast stored streaming, radio metrics can be applied (e.g., to determine throughputs etc.) in the same way as described previously relative to downloading and pre-positioning of content.

However, when a user requests a content stream, the content distribution system 12 can "opportunistically" broadcast the same content for storage on other devices, whose users may be interested in consuming the content in the future. Hence, live consumption of a stored stream can be combined with simultaneous deliveries to, and caching on, other devices that may consume the content non-real-time. If the system determines there is a sufficient number of users who might be interested in viewing the content later, it can create a broadcast session—and set up delivery of the stream via broadcast: to the live consumer and to the storage devices. The content distribution system 12 performs a spectral efficiency trade-off analysis, comparing unicast vs. broadcast transmission options.

In FIG. 8, a method for establishing a live stream is set forth. The establishment of a live stream may be continually evaluated by the distribution system. That is, the distribution system 12 can continuously determine whether to communicate a transmission by way of a broadcast or unicast. In step 810, content for a potential live stream is determined. The content for live stream may be a live event that is being transmitted at a predetermined bit rate. In step 812, a number of users interested in the live stream is determined. In step 814, a number of potential users for the live stream is also determined. The number of potential users corresponds to those users like to consume or join the live stream or are likely to consume the content in the future.

In step 816, the current popularity of the content or similar content is determined. The popularity of the content may correspond to the particular content or a similar piece of content. For example, a television series may have similar popularity across the entire series. A similar piece of content may be determined by the genre, the director, the actors, the channel and the like.

In step 818, the past popularity of similar content may also be determined. The past popularity of similar content may correspond to the popularity of content in similar genres. An average number of sign-ups for similar past live streams or content may also be determined and factored into the user potential user determination.

In step 822, the total number of predicted user devices (predicted total users) based upon the factors in steps 812-1120 is determined. Different factors may be weighted in different manners, the output of step 820 may, for example, be a number of potential users. Certainly, the number of users signed up for an event from step 812 may be considered in full within the predicted total users. However, the number of potential users, the popularity and the past popularity may change (increase) the number of predicted total users. Likewise, because various networks are used in various geographic regions, the popularity served by a particular communication network may have the number of predicted total users increase based upon a geographical factor. That is, the content may be more relevant to people or user devices in a certain geographic area and thus a localized predicted total user count is increased in a certain area. The geographic area may be a factor in determining broadcast mode, unicast mode or both because of the associated user count in the geographic area.

In step 822, the predicted total users are compared to a user threshold value. When the number of predicted users (predicted total users) is not above the threshold in step 822, step 824 unicasts the content to the user devices. In step 822, when the predicted total users are greater than the user threshold, step 826 determines the spectral efficiency for the potential broadcast group. In step 828, when the spectral efficiency is not greater than the target spectral efficiency in step 828, step 830 removes the user devices from the broadcast group. Thereafter, unicasting is used for the unicasting group in step 824 as mentioned above.

Referring back to step 828, when the spectral efficiency is greater than the target spectral efficiency, step 832 is performed. In step 832, it is determined whether the available dormant capacity is greater than a dormant capacity threshold. When the available dormant capacity is not greater than a dormant capacity threshold, step 830 is again performed which removes user devices from the group. In step 832, when the dormant capacity is greater than a dormant capacity threshold, step 834 unicast content, broadcast content or the live stream to the group of user devices.

Figure 3:
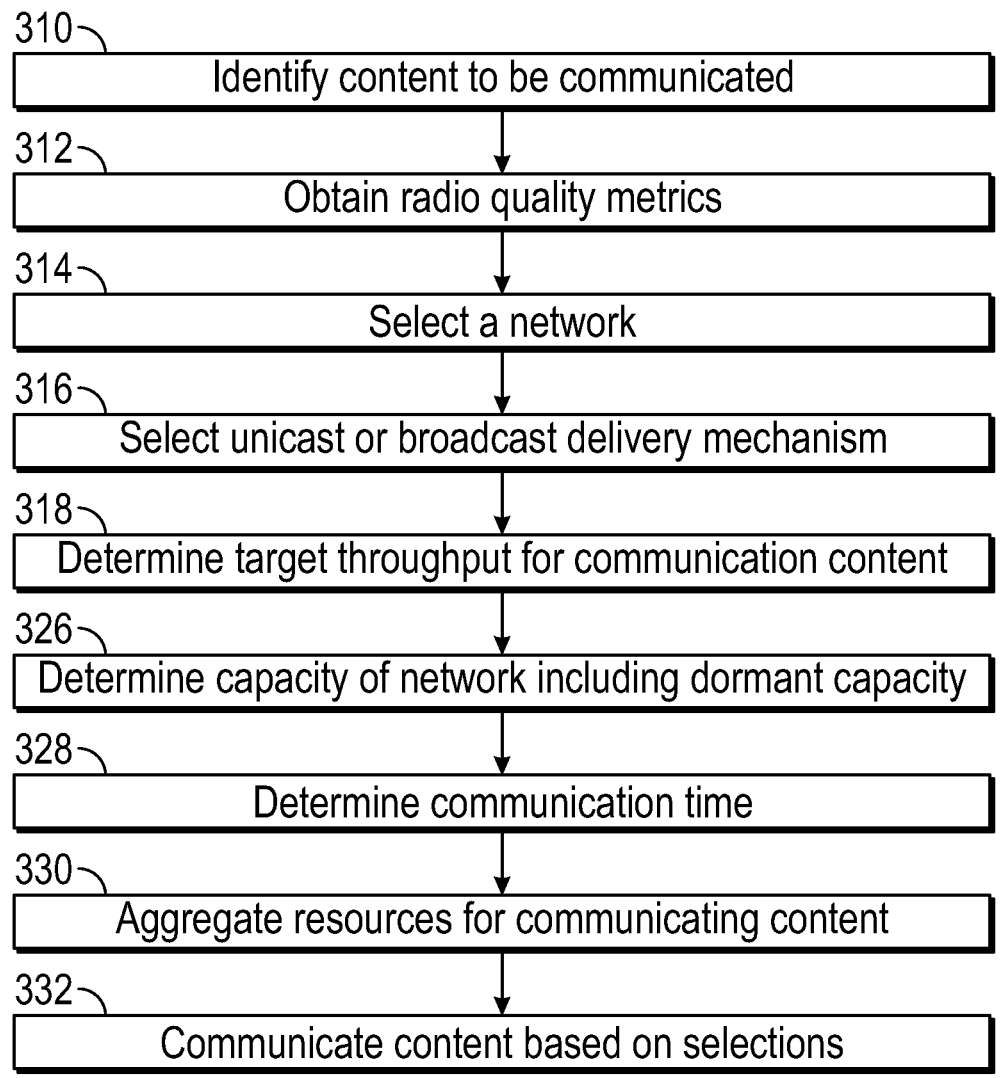
FIG. 3 is a high level flowchart of a method of operating the communication system.

Referring now to FIG. 9, step 326 of FIG. 3 is set forth in further detail. In step 326 the network capacity is determined. The content distribution system 12 can determine available network capacity by obtaining capacity usage reports from the capacity report generators 32 of the wireless network. The capacity usage reports comprise data that indicates total capacity being used by other traffic in the network, or capacity available to the content distribution system 12. In an exemplary 4G, 5G or 6G network, the reports can express available or used capacity in terms of radio resource blocks (e.g., Physical Resource Blocks or PRBs in 4G and 5G networks). The capacity usage reports may be collected in several ways. One way is by using the software agent 43A, 43B in the radio access network, e.g., at the cell level—for example, in an eNodeB in a cellular network. The software agent 43A provides a variety of network-side measurements, including radio resource usage information, directly to the content distribution system 12. In advanced wireless systems (5G and beyond), the content distribution system 12 can leverage network slicing, i.e., utilize a virtual network, carved out of the underlying physical network, for use by the content distribution system. In such a configuration, the content distribution system 12 can leverage its own network slice (and the associated bandwidth provided by the slice), the content distribution system 12 here can obtain precise information regarding the system's own capacity usage, and on how much bandwidth is available within its designated slice. The capacity usage report may contain a time the capacity is available. Another way to determine network capacity is by using application interfaces (APIs) provided by the wireless network for 3rd-party use. For example, 5G systems may provide 3rd-party APIs that notionally provide things like capacity usage information. The content distribution system 12 may also access a network management system for a particular network to obtain the network capacity.

As mentioned above, the system may use dormant capacity for transmitting content. Dormant capacity may be capacity available outside of the capacity that is required to serve a similar type of traffic that is increasingly served during peak network use and served less-so during non-peak network use. Dormant capacity can also be capacity available for content pre-positioning at the intermediate devices or user devices and within their content storage and subsequent consumption of that content by users directly from the intermediate devices, and which is not the capacity required for real-time voice and data requests from users or for distribution of content to users and for its immediate consumption. To identify dormant capacity usage patterns of the "primary, non-dormant" network may be reviewed. Dormant capacity may be automatically identified on a real-time basis by receiving information as to the amount of network not being consumed for "primary, non-dormant" use. The identified capacity may be automatically provisioned for use as the dormant capacity in response thereto. "Primary, non-dormant" capacity may run in parallel to "dormant" capacity use such that both are running across the entirety of the resource the entirety of the time but assigning a lower QoS value or identifier to the dormant capacity use so that dormant capacity is only used whenever such resources are not being used by a higher QoS "primary, non-dormant" use such as cellular, television broadcast, cable satellite and the like.

The dormant content delivery system may also be used for delivering device, software and application updates that are associated with the intermediate device or user devices associated with the intermediate device. An inventory list may also include device identifiers, software identifiers and application identifiers. The inventory list may also list the devices associated with the various software and applications.

In FIG. 9, a dormant capacity control protocol (DCCP system) 908 is used to harvest unused or dormant capacity in networks so that content is stored in the intermediate devices or user devices 16 in locations close to where the user consumes the content using an unconstrained medium, such the local area network 26 (WiFi, Ethernet etc.). In the example set forth below, the DCCP system 908 manages dormant radio resources in a wireless cellular network. However, the teachings are equally applicable to other types of networks, such as satellite systems or combinations of different types of networks such as those described above.

The content distribution system 12 of interest (which may also be referred to herewith as "service") uses inputs from the DCCP system 908 to determine how much data can be delivered and pre-position content using dormant capacity. The goal is to leverage as much of dormant capacity as possible, without contending with regular network traffic at all. The system continually adjusts its operational parameters and capacity usage targets, based on metrics received from the network 14 and the user devices or intermediate devices 16 to provide elastic dormant capacity management. The desired dormant capacity may vary by time of day as mentioned in step 328 and may be determined by input from the operator of the networks 14 from a capacity usage report. For example, at certain times of the day more dormant capacity may be used as a buffer, such as in rush hour, than other times of the day such as after in the overnight hours.

DCCP system 908 uses reports from a reporting application interface (API) the network 14 on resource usage to determine network capacity usage—and hence estimate available dormant capacity. An estimation model may be used. Over time feedback from actual usual and throughput from user may adjust the estimation model. The network capacity may be calibrated when no service data is being communicated. This may be performed at various times. In an exemplary cellular network, the reports are communicated using report signals and may by provide data, for example, on physical resource block (PRB) usage within the radio network, received from the network 14 on a per-cell basis. In a cellular network, PRB usage is most effective as a capacity usage measurement metric, since it gives a concrete view of how much of a radio capacity of a cell is being used. DCCP system 908 uses the metrics to determine the rate at which the service provider can deliver data to devices through the network 14.

The DCCP system 908 uses resource usage reports to determine the total usage level in the network 14 (referred to herewith as "total usage"). The DCCP system 908 also determines, from the report data, the level of the capacity of the network being used by regular traffic (e.g., in a wireless network, the percentage of a cell's radio resource blocks used by regular traffic). The regular capacity associated with the communication system provider is referred to as herewith as "regular usage". The DCCP system 908 then determines the maximum dormant capacity (in this example, in terms of the percentage of network resources) available for use by the content distribution system 12. This is the available dormant capacity, which may be expressed as the percentage of the total or overall system capacity and is referred to herewith as a maximum dormant capacity) Max Dormant Capacity.

An upper bound can be used for the Max Dormant Capacity. For example, a 70% threshold could be employed, which means that the DCCP system 908 will seek to maintain total usage within 70%, while staying as close to that upper bound as possible. In this example, the total usage amount is referred to as the "total usage threshold". Of course, absolute units of capacity may be used. By setting the threshold in this manner, sufficient buffer room in the network 14 accommodates sudden spikes in regular usage.

The upper bound provides a "breathing" or elasticity mechanism. That is, the increases or decreases of the network load are continuously monitored so the level of dormant capacity is continuously calibrated. The content distribution system 12 utilizes changing dormant capacity to the fullest extent possible while not causing contention with regular network traffic or creating disruptive traffic spikes. The maximum dormant capacity may be expressed as Max Dormant Capacity=total usage threshold−regular usage The DCCP system 908 also uses the network reports to estimate the level of usage of network resources by the content distribution system 12 (referred to as "service usage"). In an exemplary cellular network, service usage would signify the average instantaneous percentage usage of a cell's capacity by the Service. The DCCP system 908 measures the actual throughput (amount of data over time) achieved by each device such as a user device 16 or an intermediate device (referred to from here on as "user device 16") that receives a delivery during the reporting period. Each user device 16 may communicate the throughput as an achieved throughput signal that is ultimately communicated to an aggregator 914 of the DCCP system 908.

Service usage can either be reported explicitly by the communication network 14, or can be estimated by DCCP system 908 from total usage and regular usage, e.g., service usage=total usage—regular usage. If the communication network 14 reports to the DCCP system 908 the total usage and regular usage for a reporting period, service usage can be accurately determined.

If only total usage is reported by the communication network 14, the DCCP system 908 can estimate service usage in one of two ways. In the first way, a previously reported (by the communication network 14) accurate value of regular usage and subtracting this from total usage. This assumes that regular usage in the communication network has remained at that previously reported level since that reporting period. Regular usage may be determined by periodically measuring regular usage by deliberately not running service traffic (data) over defined intervals of time, and then measuring total usage during those periods. For those periods, regular usage=total usage. The periods of no service traffic may be referred to as Quality Control Gaps or (QC) Gap. The second way of determining service usage may be performed by applying that the system was attempting to target total usage at a level of (Max Dormant Capacity used in the current period+the previous period's regular usage) and using the delta (Δ) between actual total usage (reported for the current period) and this target to estimate regular usage and service usage. For example:

Delta(Δ)(for this reporting period)=total usage−(Max Dormant Capacity used in Current Period+Previous Period's regular usage)

regular usage(for this period)=regular usage(previous period)+Delta*<Factor−1, e.g., ½> service usage(for this period)=Max Dormant Capacity used in Current Period+Delta*<(1−Factor−1), e.g., ½>

The "Max Dormant Capacity used in current period," in turn, is estimated based on the Max Dormant Capacity value determined at the end of the prior cycle, i.e., the Max Dormant Capacity target coming into the current cycle. This number is adjusted downwards, based on downtimes in the current cycle when deliveries did not occur, and based on any throttling the Network might have done. The premise is that the system went in with a Max Dormant Capacity target, and the assessed dormant capacity usage is lower if either the full delivery cycle was not leveraged, or if a lower throughput than target was achieved (throttling). Also, if during the current delivery period, if updated capacity reports were received from the network that resulted in the Max Dormant Capacity value being modified, a weighted average Max Dormant Capacity value (based on the various Max Dormant Capacity values used during different deliveries in this period) can be used.

The idea is that the usage delta is being "debited" to both regular usage and service usage. On one hand, the Delta is being (at least partially) attributed to regular usage having increased or decreased relative to the last accurately measured value. At the same time, the Delta is being (at least partially) added to or subtracted from the value of Max Dormant Capacity, which is being used as the target capacity having been used by the Service, i.e., asserting that the Service has used more or less dormant capacity than was targeted.

With this approach, regular usage and service usage gets cumulatively adjusted period-to-period, based on the delta. This also means that Max Dormant Capacity is adjusted period-to-period, since Max Dormant Capacity=total usage threshold—regular usage.

The approach serves to continually adjust the operational settings of the DCCP system 908 to counter spikes and dips in network capacity usage driven either by increases in regular network usage or service usage.

Throughput targets are set based on DCCP system 908's learned correlation between achieved throughput and resource usage. DCCP system 908 uses prior measurements of achieved throughput and resource utilization to establish a throughput to usage ratio. DCCP system 908 then uses this ratio, in conjunction with available dormant capacity, to set and throttle throughputs to intermediate devices moving forward.

For unicast delivery, DCCP system 908 learns the correlation between the achieved throughput for a user device 16 and the network resource utilization for the delivery of content to that user device 16 in prior reporting cycles. For a single cell wireless sector, for example, resource usage would be the usage in the cell of interest. For a multi-cell (multi-carrier) wireless sector, this would be the average resource usage across the cells in the sector. The throughput to usage ratio is an efficiency or radio metric that reflects the quality of radio conditions that the user device 16 has been experiencing. The usage is resource usage (Percent or a fraction of cell capacity used). A higher ratio value would indicate more favorable radio conditions, since the user device 16 is able to extract a higher throughput for a given level of resource usage. This ratio is combined with available dormant capacity to determine the throughput target to a user device 16 for a given content delivery cycle. The throughput to usage ratio is continually refined and fine-tuned, based on continuous (cycle-by-cycle) measurements of throughput and resource usage.

The throughput to usage ratio and associated adjustment procedures provides another level of elasticity or "breathing" to the system. This approach uses continual measurements of network resource usage (by regular network traffic and by the service), as well as intermediate device throughputs, to fine-tune the ratio and continually calibrate target throughputs.

The associated content distribution system 12 may utilize unicast or broadcast transport schemes to deliver and pre-position content to user devices 16 using the dormant capacity. For example, modern cellular networks provide both broadcast and unicast transport types. With unicast, the content distribution system 12 delivers content to one device at a time. The content distribution system 12 can adopt a round-robin scheme to simulate broadcast delivery to devices. With broadcast, the same content stream is delivered to multiple devices simultaneously. Broadcast uses radio resources much more efficiently and delivers significantly improved spectral efficiency, since it uses the same set of radio resources to service many devices. The DCCP system 908 manages dormant capacity to service both unicast and broadcast delivery approaches.

Within a delivery cycle, the DCCP system 908 determines an appropriate mix of unicast and broadcast loads to be targeted by the content distribution system 12. This mix may be a proportion and can be managed to optimize for capacity (system throughput) or coverage. Such a decision would determine the broadcast/unicast "cutoff", i.e., the coverage threshold (e.g., signal strength, SINK) below which a particular device's link is deemed to be too weak for the device to be included in the broadcast group.

The proportion can be managed to optimize for capacity (system throughput) or coverage, or any other number of parameters including proportion of content to be delivered destined for one or a small number of intermediate devices, vs. proportion of content to be delivered destined to many intermediate devices, and the overall level of priority of that content. That is, if content to be delivered destined for one or a small number of intermediate devices becomes significantly higher priority than the content to be delivered to many intermediate devices, then unicast delivery can be used to deliver that content (since it's more efficient than broadcast for delivery to only one intermediate device or a small number of intermediate devices, until such priority is equalized, at which point broadcast can be used to deliver content to be delivered destined for many intermediate devices.

In essence, this becomes a linear optimization problem—optimizing the mix of number of devices included in the group, vis-a-vis the modulation and coding scheme (MCS) that can be applied to transmissions to the group (the MCS, in turn, directly influences the data rate), and the revenue obtainable to the content distribution system 12 from the service being delivered.

One dimension of the decision between broadcast and unicast may revolve around whether to choose a smaller broadcast group of devices with much better radio conditions (enabled for higher throughput covering fewer devices), and delegate the other devices to unicast, vs. choosing a larger broadcast group with a lower SNR/signal strength cutoff, enabled to receive lower throughput but covering a large number of devices-effectively maximizing the aggregate throughput achieved. The decision may be different for different communication system providers. One choice may be that may be used in determining broadcast versus unicast is when creating a smaller broadcast group of intermediate devices with significantly higher-fidelity conditions (receiving a higher modulation and coding scheme (MCS), higher throughput) maximizes system throughput. Higher MCS use translates to higher spectral efficiency. Another choice may be when creating a larger broadcast group of intermediate devices, some in slightly weaker radio conditions (i.e., having a lower cut-off) produce a higher throughput product. Broadcasting delivers higher overall spectral efficiency, given the same set of radio resources being used to serve a number of users. Hence, a larger broadcast/unicast split would increase spectral efficiency.

The linear optimization is an attempt to arrive at the right mix that produced the highest throughput and spectral efficiency.

Another dimension of the broadcast unicast mix decision may revolve around revenue maximization. That is, a smaller broadcast group of premia (high-paying) users may be prioritized when higher aggregate revenue from the content being served is higher. Conversely, a significantly larger group of lower-revenue users may be chosen to be unicasted when higher aggregate revenue is generated.

An additional constraint may be a predetermined upper broadcast capacity limit on the amount of broadcast capacity of the dormant capacity usable by the content distribution system 12 that is used. The predetermined upper broadcast capacity limit may be a percentage or fixed amount of system resources that are applied to broadcast (e.g., capping broadcast capacity of the dormant capacity at 60%+/−5% of total system capacity), which may be set forth as Target Broadcast Usage=MIN(Max Broadcast Usage, Max Dormant Capacity)

Unicast Service Traffic can then use the remaining dormant capacity

Target Unicast Usage=Max Dormant Capacity−target broadcast usage

Therefore, if unicast is the only delivery mode in use by the content distribution system 12, then:

Target Unicast Usage=Max Dormant Capacity

The DCCP system 908 correlates past service usage to achieved end device throughput in a ratio, i.e., throughput to usage ratio=throughput achieved for an intermediate device/service usage or simply throughput to usage ratio.

The throughput to usage ratio is maintained separately for each user device 16 and is an efficiency metric that reflects the radio conditions of the user device 16 and, in a wireless network, the modulation and coding scheme level (MCS) that the user device 16 is able to use. That is, if the intermediate device's signal-noise ratio (SNR) is high, the system is able to achieve a higher throughput with a given level of resource usage).

The DCCP system 908 then uses the throughput to usage ratio, and available dormant capacity (Max Dormant Capacity), to set throughput targets ("target throughput") for all the intermediate devices for the next delivery cycle. The throughput targets can be per-device target throughputs for unicast (point-point) delivery, or an average target throughput for broadcast delivery. For example, target throughput=throughput/usage*target unicast usage.

The above calculation has a target unicast usage to achieve the target throughput, based on the known correlation between Throughput and service usage. The content distribution system 12 then uses target throughput settings, derived from DCCP system 908, to adjust service usage throughput dynamically to utilize available dormant capacity, maintaining total usage in the cell within an upper bound of the total usage threshold. The idea is to use as much of the dormant capacity as possible, without going over the total usage threshold and creating any contention with regular network users. The process continues, through each reporting/delivery cycle. At the start of each delivery cycle, target throughputs are used to regulate data flow to the intermediate devices. At the end of each delivery cycle, the resource usage report for the period enables DCCP system 908 to determine actual service usage for the cycle and re-estimate the throughput to usage ratio per intermediate device. As described earlier, Max Dormant Capacity (and hence, target unicast usage) may also be adjusted period-to-period, based on adjustments made to regular usage.

A sudden spike in regular usage results in total usage spiking up (potentially exceeding total usage threshold). This can result in a higher service usage estimate than target unicast usage, and a lower throughput to usage ratio estimate for this cycle. In other words, the DCCP system 908 sees more resources having been consumed to achieve the target throughput than earlier estimated (i.e., target unicast usage). At the same time, if regular usage is adjusted upwards, target unicast usage may also be reduced. Consequently, a lower target throughput setting is determined for the intermediate device than for the current delivery cycle. In this fashion, DCCP system 908 self-corrects to bring down total usage to within threshold, moving forward. The converse happens if there is a sudden drop in regular usage, the throughput to usage ratio is increased, and a higher service throughput is targeted to fill the void.

The service usage determined for a cycle can be higher or lower than the target usage level (target unicast usage) because either: (a) regular usage spiked up or down, resulting in the calculated service usage going up or down; or (b) the prior throughput to usage ratio estimate was not accurate, and service usage was higher or lower than the dormant capacity target. In either case, DCCP system 908 self-adjusts target throughput to correct the situation. This elasticity, or breathing mechanism, helps maintain total usage within bounds, while using as much of the dormant capacity as is desired.

The logic described above can be applied to a multi-cell (multi-carrier sector) scenario in a wireless network. If a sector has multiple carriers (service providers), each carrier is treated as a cell. A content distribution system 12 can turn on carrier aggregation in a multi-carrier sector, e.g., in an LTE or 5G network. The DCCP system 908's multi-carrier handling factors in two dynamics: The intermediate device can move between carriers (cells) within the sector. This can manifest itself as a handover if the intermediate device is active and connected to the communication network. Here, the LTE network becomes immediately aware of the cell change and flags this to the content distribution system 12.

The intermediate device can execute a cell reselection procedure and change cells, in the case where the intermediate device is not actively connected to the wireless network. In this case, the network does not immediately become aware of the cell change. Further, carrier aggregation can occur, i.e., the intermediate device can be simultaneously connected to, send through and receive from, more than one carrier (cell). In LTE, for example, this can happen dynamically—the Network can add cells to/remove cells from an intermediate device at any time. The decisions are typically made by the wireless network's scheduler The multi-cell nature of this scenario leads to the premise that the intermediate device has potential access to the full bandwidth of the sector, i.e., to all carriers in the sector. Two approaches are the possible sector averaging approach and multi-cell attachment aware approach.

In the sector averaging approach, the DCCP system 908 does not depend on knowing precisely to which cells the intermediate device is connected. It assumes that each intermediate device receiving delivery has access to the overall bandwidth of the sector, and uses sector-averaged values of the key resource usage parameters, i.e., target unicast usage, total usage, service usage and regular usage.

The DCCP system 908 receives per-cell usage reports from the Network. The network also needs to inform DCCP system 908 as to which cells (carriers) are configured for the sector, and the primary cell that a user device 16 is connected.

DCCP system 908 uses various parameters in its calculations and include but are not limited to total usage=average of total usage values for all carriers (cells) in the sector, regular usage=average of regular usage values for all carriers (cells) in the sector, service usage=(average of service usage values for all carriers (cells) in the sector)/number of intermediate devices simultaneously receiving delivery in the sector (the assumption here is that resource usage was shared equally amongst all the intermediate devices that received delivery). Another parameter is target unicast usage=average of target unicast usage values for all carriers (cells) in the sector. Yet another parameter may be throughput achieved=achieved throughput (measured by the system) by the intermediate device in a delivery cycle The numbers are used in the same calculations described generically in earlier sections—to derive throughput to usage ratios and target throughputs for intermediate devices.

The Multi-Cell Attachment Aware Approach factors in precise cell attachment awareness, i.e., DCCP system 908 is aware of which cells (carriers) the user device 16 is attached to at any given point in time. The assumption here is that the communication network 14 informs DCCP system 908 when cells are added to and removed from the intermediate device's connection to the communication network 14.

In the Multi-Cell Attachment Aware Approach, the DCCP system 908 determines per-device resource usage numbers based on measurements from the actual cells that the intermediate device has been connected. The DCCP system 908 uses one of more of the following parameters in its calculations total usage=average of total usage values across the carriers (cells) the intermediate device has been connected to, regular usage=average of regular usage across the carriers (cells) the intermediate device has been connected to, service usage=average of service usage values across the carriers (cells) in the sector that the intermediate device is connected to, target unicast usage=average of target unicast usage values for all carriers (cells) in the sector and throughput achieved=achieved throughput (measured by the system) by the intermediate device in a delivery cycle.

The numbers are used in the same calculations described generically in earlier sections—to derive throughput to usage ratios and target throughputs for intermediate devices.

For purposes of adjusting targeted throughput, the user device 16 is assumed to have access to the full dormant capacity in the sector, i.e., target unicast usage averaged across all cells in the sector.

> Target throughput for an intermediate device for its next delivery period=target unicast usage*throughput/PRB The DCCP system 908 also manages the number of active threads in the system. Each enabled thread can be considered to be a content delivery task and does round-robin delivery to the intermediate devices, delivering to one intermediate device at a time—a "simulated broadcast" scheme. The round-robin, threaded scheme is another level of protection, aimed at preventing traffic spikes and regular traffic being affected. The number of parallel threads enabled per sector will depend on the regular usage in the sector. An example of a thread allocation scheme is: if regular usage for the sector<a Lower threshold, light up (N−1) Threads, where N=number of carriers in the sector. If regular usage for the sector is between the Lower threshold and an Upper threshold, light up one Thread. If regular usage for the sector>the Upper threshold, then light up 0 Threads (i.e., the system is paused)

The DCCP system 908 therefore provides an "outer layer" of control in the outer loop policy control module 916, modulating the use of capacity based on regular usage in the Network. This Thread management adds a layer of multi-carrier elasticity to the "breathing" provided by the base component of the algorithm. The threshold values are configurable and dynamically adjustable based on traffic load.

With broadcast delivery, the Service is able to serve multiple intermediate devices with the same content, using the same set of radio resources simultaneously. Hence, service usage leveraged by broadcast is exploited by multiple intermediate devices.

Broadcast functionality in wireless systems can also leverage simultaneous transmission of identical broadcast streams from multiple time-synchronized cells using the same radio channel. The synchronized multi-cell transmissions are received and combined by a device to achieve a higher signal-noise ratio (SNR), especially for cell edge devices that can hear transmissions from multiple cells. This feature extends broadcast into a multi-cell transmission paradigm, enabling a larger number of devices to receive a broadcast with good quality. Such a set of cells synchronized for broadcast constitutes the service area.

When estimating dormant capacity availability for broadcast, the DCCP system 908 considers all cells in a service area. How well an intermediate device is served by a broadcast session depends on: (a) the radio conditions the intermediate device is experiencing; (b) the available capacity of the cells the intermediate device can access; and (c) the target available capacity utilization goal based on the available capacity.

A related innovation relates to the content distribution system 12, while using the broadcast service of the communication network, the traffic load may be divided up into multiple broadcast sessions. In this example, a broadcast period consists of multiple broadcast sessions, each representing a portion of the content that the content distribution system 12 needs to download and pre-position in the participating user devices 16 in the service area. The content distribution system 12 establishes the broadcast sessions in the communication network 14, using available dormant capacity. This is done to make the process more granular, i.e., if the communication network is unable to support the total throughput requested, it will decline some sessions. However, not all sessions are declined.

At the start of a broadcast period, DCCP system 908 determines available dormant capacity in the cells that comprise the service area and establishes the target throughput for the broadcast period. This target throughput is split across the broadcast sessions established by the content distribution system 12 through the communication network 14. In an ideal situation, each participating user device 16 should receive the full target throughput. Realistically, this may not happen, because: (a) the user device 16 may not successfully receive all broadcast sessions; and (b) the user device 16 may not receive the full throughput of a session it has received.

One issue is the communication network 14 may decline one or more of the broadcast sessions the content distribution system 12 has requested to be established. This is part of admission control functionality typically supported by wireless networks. For example, if the content distribution system 12 has requested the establishment of 20 broadcast sessions at 1 Mbps each, the communication network 14 may decide to admit just 12 of the sessions. This can vary across the cells in the service area. For example, one cell may have the capacity to admit all 20 sessions, whereas another cell in the service area may only have the capacity to admit 15 sessions.

The disparity in the number of sessions may happen because the regular user traffic of the communication network requires enough capacity from the system, to allow for only 12 of the broadcast sessions to be carried out while preserving sufficient capacity for the rest of the regular user traffic. Therefore, some sessions may be admitted only by a subset of the cells in the service area; and hence may not be received by all user devices 16 in the service area. Hence, a given intermediate device that is part of the broadcast period may receive only a subset of the sessions delivered. This occurs when one or more cells allows the establishment of a different number of sessions from the 20 requested, due to the contention with regular user traffic as described above. In this case, cells may have only 12, 15, or 18 or any other subset of 20 sessions admitted.

Similarly, the modulation and coding scheme (MCS) rate chosen for the broadcast in a given service area may effectively be demodulated by only a subset of the devices in a given cellular area. This may be as a result of the SINK of the individual devices in any given cell within the service area, providing for a device to effectively decode a certain MCS rate, or otherwise not be able to decode it due to inferior RF conditions. As such, the throughput achieved by the broadcast session across a cell, may be as high or lower, than the rate sent by the broadcast session. That is, if only 80% of the users are able to receive the 1 Mbps throughput in a session, the average throughput received by an intermediate device in this cell or broadcast session (as the average throughput across all participating intermediate devices in such cell or service area) will be 800 Kbps.

Average throughput received by the user device 16 across a cell or service area then becomes an important metric and becomes an important factor in understanding efficiency or radio metric of a broadcast—as the % of the throughput sent by a session vs the throughput received by the group of devices. Further, it can then be learned how this efficiency of a broadcast session changes, depending on the MCS level chosen for the broadcast and the robustness of the SINRs of the participating devices. Separately, it can be learned how much the efficiency is dependent on the level of dormant capacity loading attempted vs the level of regular user traffic available across the service area.

Another useful feedback metric is coverage level, defined as the percentage of devices in the broadcast that experienced delivery failure rates of less than a defined threshold value.

At the start of a broadcast period, the DCCP system 908 determines the Broadcast target throughput for the period. This can be done in different of ways including using a reasonable spectral efficiency target or the radio conditions at the intermediate device 16.

For the reasonable spectral efficiency target 1 bit/sec/Hz is often used as a thumb rule for wireless broadcast systems. The target is applied to target broadcast usage to determine Broadcast target throughput. In other words, multiply the total spectral bandwidth in the available radio resource blocks by the chosen spectral efficiency to get the target throughput. This can be done cell by cell in the service area, based on the available dormant capacity in each cell. A target throughput is thus derived per-cell. An aggregated target throughput value, across all the cells in the service area, then needs to be derived from the per-cell values. This is because the content distribution system 12 ultimately has to submit one target throughput value, per session, to the wireless network. The aggregation in the aggregator 914 can be done in multiple ways, including but not limited to choosing the lowest number obtained across all the cells (least common denominator approach)—if coverage maximization is the goal; choosing the highest number obtained across all the cells (the Network can always scale the service back, cell-by-cell, if it cannot meet that requirement); or, determining an "adjusted mean" based on the spread of the individual per-cell throughput values.

The adjusted mean approach takes into account the throughput actually allocated to the content distribution system 12 by the communication network will lie somewhere between the requested target throughput value and the lowest throughput supportable across the cells in the service area. If the spread of the per-cell throughput values is high, the service could end up receiving a significantly lower throughput than the requested value. For example: if the target throughput values are spread between 10 Mbits/sec and 30 Mbits/sec, and the content distribution system 12 requests a mid-value of 20 Mbits/sec, the content distribution system 12 will realistically get a throughput somewhere between 10 and 20 Mbits/sec. This is because the cells with the higher available capacity levels (i.e., capable of providing greater than 20 Mbits/sec) will still only provide 20 Mbits/sec. However, the "less capable" cells will provide throughputs ranging from 10 to 20 Mbits/sec, depending on their available capacity levels.

If, however, the spread is narrow (e.g., between 15 and 20 Mbits/sec), the content distribution system 12 will not get an allocation far removed from its requested rate. Therefore, taking this spread into account is helpful. The idea here is to choose a net throughput target higher than the average; the deviation from the mean being determined by the spread (standard deviation); the higher the standard deviation, the higher the selected value is above the mean. For example, choosing a value like (Mean+1 Standard Deviation) would make sense.

The target spectral efficiency level can subsequently be adjusted (for future broadcast periods), taking into account achieved throughput and Coverage Level feedback. For the next broadcast period, for the same service area, target spectral efficiency can be adjusted up or down based on the feedback collected.

A more deterministic approach uses measurements of the radio conditions of the intermediate device, to more accurately determine a deliverable throughput target. For each participating intermediate device, the radio channel quality (measured by signal strength, signal/noise-interference ratio (SINK), channel quality indicators, and other similar metrics) is used to determine a target modulation and coding scheme (MCS) level for the intermediate device.

The mapped MCS level reflects the highest modulation order that the intermediate device, in its current radio conditions, can reliably demodulate; as well as the level of channel coding (forward error correction) that needs to be applied to correct errors. The MCS level reflects the applicable spectral efficiency target and is converted to target throughput (for the intermediate device), based on the number of available radio resource blocks. Once this is done, the individual (per-device) target throughputs can be aggregated across all participating user devices 16 in the service area. As explained for the earlier method, the aggregation may involve choosing the mean target throughput value across all the intermediate devices, choosing a least common denominator choice, i.e. the lowest of the per-intermediate device values calculated across all the intermediate devices, choosing a highest common denominator value, i.e. the highest of the per-intermediate device values calculated across all the intermediate devices, choosing an "adjusted mean" value, factoring in the spread across all per-intermediate device target throughput values.

Once the overall target throughput for a broadcast period is determined (Broadcast target throughput), this is divided into multiple parallel broadcast sessions within the period.

Target throughput per Session=Broadcast target throughput/Throughput per Session For example, if the overall throughput target is 20 Mbits/sec, and it is desired to run broadcast sessions with 1 Mbit/sec each, 20 identical broadcast sessions are started up.

At the end of a broadcast period, DCCP system 908 determines achieved device throughputs and Coverage Level. DCCP system 908 also determines the Resource Usage-per-cell, and average across the cells in the service area, for the broadcast period. Available dormant capacity is also updated at this point.

For parallel unicast sessions, the DCCP system 908 continues to manage dormant capacity. Unicast sessions are handled as described earlier, but with the target unicast usage value being used for Max Dormant Capacity, at least while broadcast sessions are simultaneously occurring.

Adjustments Based on Regular Network Traffic Load

Regular metrics from the communication network 14 inform the DCCP system 908 as to whether the regular traffic load in the network has gone significantly up or down. If network load goes up significantly, DCCP system 908 can shut down a number of broadcast sessions based on the estimated loading increase. Conversely, new broadcast sessions can be started up if network load is seen to have reduced significantly.

Radio Measurements may be leveraged to fine-tune operation of the system. In addition to collecting and using radio resource usage metrics to manage dormant capacity (as explained so far), DCCP system 908 can also leverage network quality measurements. For example, signal strength and signal-noise ratio measurements can be used. In some wireless systems, it is possible to obtain signal strength and signal-noise ratio metrics specific to unicast and broadcast, i.e., determine how well the intermediate device can receive unicast signals as well as broadcast signals combined from multiple cells. Additionally, radio quality metrics such as latency and jitter can factor in as well.

Measurements can be collected in at least two ways. The first is by having the participating user device 16 collect the radio metrics (e.g., from the modem processing unit in the intermediate device) and conveying them (over-the-top) to the service provider functionality located at the other end of the communication network 14. The user device 16, in many ways, provides the best eyes-and-ears, since it can quantify the precise quality of experience it is receiving.

By deploying a software agents 912A-912C in the radio access network, e.g., at the cell level—for example, in an eNodeB in a cellular network. The software agent 912 here provides a variety of network-side measurements, including radio resource usage information, directly to the content distribution system 12. Such information may include the regular usage being consumed so that the dormant capacity may be ascertained therefrom. The software agents 912A-912C each may have respective estimation models 913A-913C therein for determining the usage of the particular network. The models add some degree of prediction to the direst usage measurements. Adjustments to the estimation models may be made over time with feedback from intermediate devices and user devices.

The DCCP system 908 leverages the metrics to refine its dormant capacity management. For example, DCCP system 908 then uses signal strength and or signal-noise ratio measurements to derive the appropriate modulation and coding scheme (MCS) level that the radio network might use to deliver content to a given intermediate device. Using this projected MCS level, DCCP system 908 can better quantify a target throughput to be used for the intermediate device.

For broadcast, the same scheme can be used to determine the possible MCS level for each participating user device 16 in the service area, derive the average MCS level usable for that population of user devices 16, and then use the MCS level to set a more accurate target throughput for the broadcast period.

Additionally, radio quality metrics such as latency and jitter can be used to further refine the understanding at the DCCP system 908's of the radio conditions of the intermediate devices, and further fine-tune dormant capacity management.

The DCCP system 908 has an outer-loop parametric control system as illustrated in FIG. 10. Key operational parameters that drive DCCP system 908 operation such as total usage threshold and Real Usage thresholds for Thread management are either configured (e.g., through a dashboard or programmatic API) or learned. A learning scheme uses historical data to determine day-of-week, time-of-day settings for the parameters. For example, total usage threshold values can be set for different times of the day, and different days of the week, by observing and storing past measurements of total usage, and assessing typical time-of-day, day-of-week total usage values.

In general, the DCCP system 908 receives per-cell reports with the data described above from the communication network 14 and uses the metrics to estimate dormant capacity and service usage. The aggregator 914 component then consolidates processing across sectors and service areas (for broadcast), and determines throughput to usage ratios and target throughputs (for intermediate devices or for broadcast periods). Feedback from the user device 16 informs DCCP system 908 on real throughput achieved by the user devices 16. Finally, an outer-loop policy control module 916 proactively configures the DCCP system 908 operation with the parameters that drive its operation. The output from the DCCP system 908 drives the operation of the content distribution system 12, informing the service as to when to start/pause/resume content delivery and what the target throughputs to intermediate devices are.

The DCCP system 908 may be used for determining both broadcast and unicast for the mix of broadcast and unicast provided by the content distribution system 12. An optimum mix may be provided based upon the perimeters set forth above. The target throughput for a broadcast session using dormant capacity or unicast sessions is set forth.

Radio quality metric data such as the signal strength or the signal to noise ratio are used to fine-tune the dormant capacity management and operational settings. Outer loop policy controls dynamically adjust the DCCP system operating parameters based upon feedback from the wireless network. The dynamic adjustment of thresholds such as the upper bound traffic usage threshold or the buffer may be changed. The DCCP for multiple unicast and broadcast cell configuration mode is provided. The system can accommodate a single-cell single carrier sector or sector with multiple carriers with or without carrier aggregation. The DCCP system 908 for dual connectivity scenarios is enabled. Of course, the present system may be used with a variety of wireless technologies including LTE, 5G and satellite technologies.

Aggregation of Radio Resources

Referring now to FIG. 10 radio channel quality metrics can also be used to enable the use of aggregation of resources as mentioned above in step 3308 of FIG. 3 (e.g., cells, base stations in a network—and even across networks). Aggregation is a feature that may be used in wireless networks—notably 4G and 5G systems. Aggregation can take several flavors.

On one level, networks aggregate bandwidth across cells within a cell site (e.g., the base stations 42A, 42B or eNodeB/gNodeB in 4G/5G terms). Each cell transmits a wireless carrier, and hence provides spectral bandwidth or capacity that is used for data transmission/reception. The capacity provided by two or more cells (i.e., their carriers) may be aggregated within a sector of the cell site, or across any areas covered by the site with coverage overlap.

On another level, the network may aggregate cells (i.e., their carriers) across cell sites (base stations), as long as the cells provide overlapping coverage. In 4G and 5G systems, this is referred to as Dual Connectivity. Dual Connectivity may be extended to work across multiple networks, e.g., aggregation of 4G and 5G cells is possible as well.

Radio quality metrics are used to estimate and set target per-device throughputs for content distribution for carrier-aggregated scenarios. For example, in the case of an intra-network aggregation scenario (i.e., aggregation of cells in a cell site, or of cells across base stations), the content distribution system 12 receives a capacity report from the network provider in step 1010. For user device (such as 16D in FIG. 2) that is getting coverage from multiple cells for each cell in the aggregation set the available spectral capacity in the cell is estimated in step 1012. This can be obtained through capacity reports extracted from the network in step 1010. In step 1014 the highest spectral efficiency level that can be applied to deliveries to/receptions from the device under consideration is determined. The highest spectral efficiency level may be obtained from the radio quality of the device's channel on the particular cell from step 1016, as reported by the device as described ab over. In step 1018 the target throughput that is possible to the device from the particular cell is determined by Target Throughput(possible to device on this cell)
=Available spectral capacity(Hz)×spectral efficiency(bits/s/Hz).

The available spectral capacity may be the total available spectral capacity in the frequency domain which can be converted to PRBs.

In step 1020, if the device is not capable of cell/carrier aggregation, the target throughput of step 1020 is set as the target throughput of step 1018*x* as:

Target Throughput=MAX(individual per-cell Target Throughput values).

In step 1020 if the device is capable of aggregation of cell, carrier or technology, the overall target throughput is set in step 1024 as:

Target Throughput=SUM(Target Throughput for each cell in the set).

Similar logic can be applied to inter-network aggregation scenarios. For example, if the wireless system is aggregating carriers across 4G and 5G systems, the content distribution system 12 can leverage metrics quantifying the quality of the device's radio channel in each cell (4G or 5G) to determine target throughput possible for the device over each system and then additively determine and set overall target throughput.

Intelligent Network Selection & Usage of Multiple Networks

The content distribution system 12 can leverage radio quality metrics from different available networks to select one or more optimal transmission networks to distribute content through.

Referring now to FIG. 11, the use of network resources can be optimized. In step 1110 the radio quality of one or more connection or networks to a user device is obtained. In step 1112 when one or more connections are not to be aggregated in step 1112, step 1114 selects the highest radio quality from the possible networks. That is, the network that the user device has the highest-quality radio connection to, e.g., the best SINR, signal strength, latency measurements, etc. is chosen.

In step 1112 when aggregation is to be used, step 1116 the radio quality of various potential connections is compared to a radio quality threshold. When the radio quality is not above the threshold, the network may not be used in step 1120. In step 1118, when multiple networks are over the radio quality threshold, step 1122 selects one or more networks with which the user device has radio connections that are above the radio quality threshold (e.g., SINR/signal strength/round-trip latency/throughput). The system aggregates bandwidth across multiple networks (pathways available to the user) that meet quality criteria.

Referring now to FIG. 12, in addition to the radio quality described above, the available bandwidth of the network or networks under consideration may be taken into consideration. In step 1210, the available capacity available for a network or networks accessible by the user device is determined. The target available capacity utilization goal in this figure may be used interchangeable with the available capacity. In step 1212 if aggregation is not to be used, the content distribution system in step 1214 selects the network with the highest bandwidth capacity available such as the bandwidth available within the target available capacity utilization goal. That is, the least busy network is chosen.

In step 1212, if aggregation will be used, the content distribution system in step 1216 compares the available capacity with a capacity or bandwidth threshold. In step 1218 if no networks have available capacity above a capacity threshold, step 1220 does not select any network. In step 1218 when one or more networks, each with capacity availability that exceeds the capacity threshold is determined, step 1222 aggregates bandwidth across multiple networks (pathways available to the user) that meet quality criteria. The selected networks that meet the radio quality in FIG. 11 and the available bandwidth thresholds of FIG. 12 are then used by the content distribution system 12 to communicate the content using multiple paths simultaneously.

In this manner, by applying the above, a time for delivery of content may be determined by choosing to communicate content to a first user device at the time when the radio quality metrics of the first user device are greater than the radio quality metrics for a second user device. Then at a second time later than the first time, the content may be communicated to the second user device when the radio quality metrics of the second user device improve.

In another example, selecting one of a plurality of networks to communicate content to the user device based on the radio quality metric signal may be performed to achieve the highest throughput to the user device. The selecting of one of the plurality of networks may also be done to achieve a higher overall spectral efficiency compared to communicating to a plurality of user devices by the plurality of networks.

In summary, selecting and aggregating of network may take into various network conditions and parameters. For example, selecting or aggregating may comprises selecting one of a plurality of base stations or aggregating the plurality of base stations for communicating the content to the user device. Selecting or aggregating may select or aggregate a plurality of cells within a base station for communicating content to the user device. Selecting or aggregating may be performed by selecting or aggregating a plurality of cells or base stations from different network operators for communicating the content to the user device. Further, selecting or aggregating may comprise selecting or aggregating a plurality of technologies for communicating the content to the user device. The plurality of technologies may be 4G and 5G. Selecting or aggregating may also include selecting or aggregating a plurality of networks or a plurality of technologies for communicating the content to the user device based on radio conditions. Selecting or aggregating may also include selecting or aggregating a plurality of cells across a plurality of technologies for communicating the content to the user device.

By performing the above steps, harvesting underutilized and dormant network capacity, e.g., using network paths when regular use is low, on a consistent basis is performed. The network conditions may be continually monitored and the communication of content to used devices adjusted. In particular, when real-time streaming and consumption occurs (i.e., the Live Streaming or Stored Streaming use cases), the content distribution system 12 can choose a broadcast-centric network to deliver via broadcast. For example, a TV broadcast network could be used. A network using a lower-frequency band, such as 600 MHz, could be used (since lower frequencies provide longer ranges). This is important, since the main network accessible to the system (e.g., LTE or 5G network) is likely to be busy with other traffic loads, e.g., regular unicast traffic. Hence, usage of alternative networks such as TV broadcast or 600 MHz would offload broadcast, off the main network—and allow the LTE or 5G network to focus on what it primarily needs to handle.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method comprising:
   receiving, by a content distribution system, a radio quality metric signal from a user device or a network;
   determining, by the content distribution system, a spectral efficiency for the user device based on the radio quality metric signal;
   receiving a capacity usage report from a first network;
   determining an available capacity of the first network based on the capacity usage report;
   determining a target available capacity utilization goal of the first network based on the available capacity;
   determining a target throughput based on the target available capacity utilization goal for communicating content to a user device and the spectral efficiency for the user device; and
   communicating the content to the user device using the target throughput through the first network.

2. The method of claim 1 wherein communicating the content to the user device comprises communicating the content to the user device by unicasting.

3. The method of claim 1 wherein receiving the radio quality metric signal comprises receiving the radio quality metric signal from a base station of the network.

4. The method of claim 1 wherein receiving radio quality metric signal comprises receiving at least one of a signal strength, a signal-to-interference/noise ratio measurement signal, round-trip latency, a channel quality indicator, and an achieved throughput.

5. The method of claim 4 wherein determining the spectral efficiency comprises determining the spectral efficiency from a modulation and coding scheme determined based on the at least one of at least one of the signal strength, the signal-to-interference/noise ratio measurement signal, round-trip latency, the channel quality indicator, and the achieved throughput.

6. The method of claim 1 wherein receiving radio quality metric signal comprises receiving, a signal-to-interference/noise ratio measurement signal.

7. The method of claim 1 further comprising receiving the content at the user device after communicating the content, and thereafter receiving an achieved throughput signal or round-trip latency at the content distribution system and the capacity used in communicating.

8. The method of claim 1 wherein receiving the capacity usage report comprises receiving an amount of available network capacity in the capacity usage report.

9. The method of claim 8 wherein receiving the capacity usage report comprises receiving the capacity usage report comprising at least one of capacity used by user traffic associated with a network operator, a total capacity of the network, a capacity used by a dormant capacity communication system, and total capacity used by any traffic.

10. The method of claim 9 wherein determining the available capacity comprises determining the available capacity based on the total capacity used by any traffic minus the capacity used by the capacity used by the dormant capacity communication system.

11. The method of claim 10 further comprising determining the capacity used by the dormant capacity communication system comprises estimating a throughput sent to user devices over a period of time and the spectral efficiency of the user devices receiving dormant capacity content.

12. The method of claim 1 wherein the capacity usage report comprises available capacity of the network and a time period for the available capacity.

13. The method of claim 1 wherein the capacity usage report comprises a percentage of available physical resource blocks or spectrum used by user devices associated with a network operator.

14. The method of claim 1 wherein the capacity usage report comprises available physical resource blocks or available spectral capacity.

15. The method of claim 1 wherein the capacity usage report comprises a total of physical resource blocks used by user devices or an amount of spectrum using the first network.

16. The method of claim 1 wherein determining a target available capacity utilization goal of the first network based on the available capacity comprises identifying a desired total network loading by all network traffic, or achieving a network loading having a predetermined margin of available capacity unused.

17. The method of claim 1 wherein determining a target throughput based on the target available capacity utilization goal for communicating content to a user device and the spectral efficiency for the user device comprises multiplying the spectral efficiency for a user device by the target available capacity utilization goal.

18. The method of claim 1 further comprising determining a time for delivery by choosing to communicate content to a first user device at a first time when the radio quality metrics of the first user device are greater than the radio quality metrics for a second user device, and, at a second time later than the first time, communicating the content to the second user device when the radio quality metrics of the second user device improve.

19. The method of claim 1 further comprising selecting one of a plurality of networks to communicate content to the user device based on the radio quality metric signal to achieve a highest throughput to the user device, or to achieve a higher overall spectral efficiency compared to communicating to a plurality of user devices by the plurality of networks.

20. The method of claim 1 further comprising determining the target throughput by adding the target throughputs to the user device with the target throughputs to other user devices to be served by a dormant capacity communication system at a given time.

21. The method of claim 1 further comprising aggregating a plurality of networks to communicate content to the user device based on the radio quality metric signal for each network and selecting a mix of networks based on the radio quality metric signal for each network based on achieving a highest throughput to the user device at an instant in time or achieving a higher overall spectral efficiency when considering communication to a plurality of user devices being communicated to by the plurality of networks.

22. The method of claim 1 wherein communicating the content using the target throughput through dormant capacity of the first network.

23. The method of claim 1 wherein determining the target throughput comprises determining the target throughput from a plurality of capacity usage reports from a plurality of networks and wherein communicating content comprises selecting one of the plurality of networks or aggregating at least some of the plurality of networks to communicate content.

24. The method of claim 23 wherein selecting or aggregating comprises selecting one of a plurality of base stations or aggregating the plurality of base stations for communicating the content to the user device.

25. The method of claim 23 wherein selecting or aggregating comprises selecting or aggregating a plurality of cells within a base station for communicating content to the user device.

26. The method of claim 23 wherein selecting or aggregating comprises selecting or aggregating a plurality of cells or base stations from different network operators for communicating the content to the user device.

27. The method of claim 23 wherein selecting or aggregating comprises selecting or aggregating a plurality of technologies for communicating the content to the user device.

28. The method of claim 27 wherein the plurality of technologies comprises 4G and 5G.

29. The method of claim 23 wherein selecting or aggregating comprises selecting or aggregating a plurality of networks or a plurality of technologies for communicating the content to the user device based on radio conditions.

30. The method of claim 23 wherein selecting or aggregating comprises selecting or aggregating a plurality of cells across a plurality of technologies for communicating the content to the user device.

31. A system comprising:
a content distribution system receiving a radio quality metric signal from a user device or a network;
the content distribution system determining a spectral efficiency for the user device based on the radio quality metric signal;
the content distribution system receiving a capacity usage report from a first network;
the content distribution system determining an available capacity of the first network based on the capacity usage report;
the content distribution system determining a target available capacity utilization goal of the first network based on the available capacity;
the content distribution system determining a target throughput based on the target available capacity utilization goal for communicating content to a user device and the spectral efficiency for the user device; and
the content distribution system communicating the content to the user device using the target throughput through the first network.

32. The system of claim 31 wherein the content distribution system communicating the content to the user device by unicasting.

33. The system of claim 31 wherein the content distribution system receives the radio quality metric signal from a base station of the network.

34. The system of claim 31 wherein the radio quality metric signal comprises at least one of a signal strength, a signal-to-interference/noise ratio measurement signal, round-trip latency, a channel quality indicator, and an achieved throughput.

35. The method of claim 34 wherein the spectral efficiency is based on a modulation and coding scheme determined based on the at least one of at least one of the signal strength, the signal-to-interference/noise ratio measurement signal, round-trip latency, the channel quality indicator, and the achieved throughput.

36. The system of claim 31 wherein the radio quality metric signal comprises a signal-to-interference/noise ratio measurement signal.

37. The system of claim 31 wherein the content distribution system, after communicating the content, receives an achieved throughput signal or round-trip latency and the capacity used in communicating.

38. The system of claim 31 wherein the capacity usage report an amount of available network capacity.

39. The system of claim 38 wherein the capacity usage report comprises at least one of capacity used by user traffic associated with a network operator, a total capacity of the network, a capacity used by a dormant capacity communication system, and total capacity used by any traffic.

40. The system of claim 39 wherein the available capacity is based on the total capacity used by any traffic minus the capacity used by the capacity used by the dormant capacity communication system.

41. The system of claim 40 wherein the capacity used by the dormant capacity communication system comprises a throughput sent to user devices over a period of time and the spectral efficiency of the user devices receiving dormant capacity content.

42. The system of claim 31 wherein the capacity usage report comprises available capacity of the network and a time period for the available capacity.

43. The system of claim 31 wherein the capacity usage report comprises a percentage of available physical resource blocks or spectrum used by user devices associated with a network operator.

44. The system of claim 31 wherein the capacity usage report comprises available physical resource blocks or available spectral capacity.

45. The system of claim 31 wherein the capacity usage report comprises a total of physical resource blocks used by user devices or an amount of spectrum using the first network.

46. The system of claim 31 wherein a target available capacity utilization goal of the first network is based on a desired total network loading by all network traffic, or a network loading having a predetermined margin of available capacity unused.

47. The system of claim 31 wherein the target available capacity utilization goal comprises a product of the spectral efficiency for a user device and the target available capacity utilization goal.

48. The system of claim 31 further comprising a time for delivery to a first user device at a first time when the radio quality metrics of the first user device are greater than the radio quality metrics for a second user device, and, at a second time later than the first time, and to the second user device when the radio quality metrics of the second user device improve.

49. The system of claim 31 the content distribution system selects one of a plurality of networks to communicate content to the user device based on the radio quality metric signal to achieve a highest throughput to the user device, or to achieve a higher overall spectral efficiency compared to communicating to a plurality of user devices by the plurality of networks.

50. The system of claim 31 wherein the target throughput by adding the target throughputs to the user device with the target throughputs to other user devices to be served by a dormant capacity communication system at a given time.

51. The system of claim 31 wherein the content distribution system aggregates a plurality of networks to communicate content to the user device based on the radio quality metric signal for each network and selects a mix of networks based on the radio quality metric signal for each network based on achieving a highest throughput to the user device at an instant in time or achieving a higher overall spectral efficiency when considering communication to a plurality of user devices being communicated to by the plurality of networks.

52. The system of claim 31 wherein the content distribution system communicates the content using the target throughput through dormant capacity of the first network.

53. The system of claim 31 wherein the target throughput is based on a plurality of capacity usage reports from a plurality of networks and wherein the content distribution system communicates content by selecting one of the plurality of networks or aggregating at least some of the plurality of networks to communicate content.

54. The system of claim 53 wherein the content distribution system selects or aggregates by selecting one of a plurality of base stations or aggregating the plurality of base stations for communicating the content to the user device.

55. The system of claim 53 wherein the content distribution system selects or aggregates by selecting or aggregating a plurality of cells within a base station for communicating content to the user device.

56. The system of claim 53 w wherein the content distribution system selects or aggregates by selecting or aggregating a plurality of cells or base stations from different network operators for communicating the content to the user device.

57. The system of claim 53 wherein the content distribution system selects or aggregates by selecting or aggregating a plurality of technologies for communicating the content to the user device.

58. The system of claim 57 wherein the plurality of technologies comprises 4G and 5G.

59. The system of claim 53 wherein the content distribution system selects or aggregates by selecting or aggregating a plurality of networks or a plurality of technologies for communicating the content to the user device based on radio conditions.

60. The system of claim 53 wherein the content distribution system selects or aggregates by selecting or aggregating a plurality of cells across a plurality of technologies for communicating the content to the user device.

* * * * *